United States Patent [19]

Raman et al.

[11] Patent Number: 5,572,625
[45] Date of Patent: Nov. 5, 1996

[54] METHOD FOR GENERATING AUDIO RENDERINGS OF DIGITIZED WORKS HAVING HIGHLY TECHNICAL CONTENT

[75] Inventors: T. V. Raman; David Gries, both of Ithaca, N.Y.

[73] Assignee: Cornell Research Foundation, Inc., Ithaca, N.Y.

[21] Appl. No.: 141,348

[22] Filed: Oct. 22, 1993

[51] Int. Cl.$^6$ .............................. G10L 5/02; G10L 9/00; G10L 3/00
[52] U.S. Cl. ............................................. 395/2.69; 395/2.8
[58] Field of Search ................................. 395/2.68, 2.69, 395/2.75, 2.79, 2.8, 2.87; 434/112, 116, 128

[56] References Cited

U.S. PATENT DOCUMENTS

| | | | |
|---|---|---|---|
| 3,704,345 | 11/1972 | Coker et al. | 395/2.75 |
| 4,075,689 | 2/1978 | Berkling | 395/775 |
| 4,582,441 | 4/1986 | Carter et al. | 400/712 |
| 4,694,494 | 9/1987 | Woolfson | 395/2.69 |
| 4,811,400 | 3/1989 | Fisher | 395/2.69 |
| 4,935,877 | 6/1990 | Koza | 395/13 |
| 5,251,292 | 10/1993 | Martel, Jr. et al. | 395/150 |
| 5,390,282 | 2/1995 | Koza et al. | 395/13 |

OTHER PUBLICATIONS

Ziemer et al., "Introduction to Digital Communication", Macmillan Publishing Company, 1992, p. 344.
Raman, "Tex Talk", Cornell University, Oct. 6, 1990.

*Primary Examiner*—Allen R. MacDonald
*Assistant Examiner*—John Michael Grover
*Attorney, Agent, or Firm*—Salzman & Levy

[57] ABSTRACT

The present invention provides a method for producing auditory renderings of digitized works and, in particular, digitized documents containing complex mathematical expressions. Documents are first entered into a computer system and formatted with a markup language, such as one of the TeX® or LaTeX® family of languages. The formatted documents are parsed to provide a tree-structured, high-level representation. Mathematical expressions are in quasi-prefix form. Lexical analysis and recognition processes are then undertaken. The resulting analyzed documents are provided to an audio output device (such as a voice synthesizer) operating under control of a set of predetermined rendering rules. The resultant audio signal contains not only textual content but also the analogical markings produced by the reading rules. Multichannel audio outputs may be used to allow for spatial placement capability, in addition to the other analogical markings. An audio formatting language (AFL) is provided to allow for manipulation of rendering rules. A browsing capability is also provided to allow a listener to easily locate his or her place in a document.

17 Claims, 6 Drawing Sheets

Expression: ( a + b ) * c

Prefix form: * + a b c

Tree Structure:

METHOD FOR GENERATING AUDIO RENDERINGS OF DIGITIZED WORKS HAVING HIGHLY TECHNICAL CONTENT

FIELD OF THE INVENTION

This invention was made with government support under contract no. AFOSR-91-0328, awarded by the Air Force Office of Sponsored Research. The government has certain rights in the invention.

The present invention pertains to a method of converting textual information into an audio output and, more particularly, to a method by which textual and mathematical information in digital form is converted or transformed to an audio equivalent expression through the utilization of rendering rules written in an audio formatting language. The method is especially useful for assisting the visually impaired to easily comprehend highly sophisticated technical information.

BACKGROUND OF THE INVENTION

The problem of giving the visually impaired access to the vast treasure of the printed word has long plagued mankind. Early attempts were nothing more than one person reading aloud to another. With the advent of the long-playing phonograph record, recordings of certain words became available. This idea has expanded to include cassette tapes and, more recently, the optical disks. The recorded-book concept presupposes that there will be a broad audience for a particular work. Production costs would otherwise be prohibitive. But, another kind of difficulty is posed by technical material, including mathematical equations. A simple algebraic equation such as "a+b=c" presents no problem to even the least experienced reader, but complex expressions containing integrals and summations having limits, etc. create a harder task. While reading matter containing complex expressions avowedly presents problems for the reader, the listener has an even thornier dilemma in trying to create and store mental pictures of what is being read.

A recent approach to the problem of converting the printed word to the spoken word has been to use optical character recognition (OCR) techniques to scan printed matter into a computer. A text-to-voice device, typically a voice synthesizer, then "speaks" the text file to the visually impaired listener. To be for successful, this technique requires that both the scanning and the speaking processes be relatively flawless. In addition, OCR reliability is influenced by the quality of the printed document being scanned. Most scanning programs are not adapted for handling changes of font or character size and style (e.g., bold, italic, etc.); such programs are easily confused by dirt, tears or other distortions of the original document. Scanning a bound volume obviously presents mechanical problems. Hence, an 80–90% accurate scan rate is considered good, and a 90–95% accuracy rate outstanding.

Two types of errors are encountered in OCR scanning: rejects and substitutions. A "reject" is defined as a character that the scanner cannot read at all, while a "substitution" is an incorrectly read character. Either error passed to a speech output device can lead to an unintelligible reading of the word. There are no scanning programs commonly available which can accurately scan a mathematical equation of even moderate complexity.

At the output part of the process, special features are required in order to recognize the mathematical equations so as to be able to "speak" them intelligibly. Self-contained reading machines embodying the aforementioned processes are known in the art, but generally suffer from the limitations hereinabove described.

When a person reads a complex mathematical equation, he or she is provided with several typographical features which aid in the understanding of the equation's meaning. For example, subscripts are generally positioned below the character to which they relate. In addition, a subscript is usually printed in a smaller size of type than the number to which it refers. Similar typographical conventions are generally applied to superscripts, limits upon integrals or summations and to other like operators. Even a reader having a relatively high level of mathematical understanding must use stilted language in order to read aloud the simplest form of mathematical expression. Unfortunately, the listener must construct a mental image of an expression based upon spoken, stilted language.

What is needed to aid this conversion process is a technique for applying equivalents in the auditory domain of those typographical aids available to a reader.

It is therefore an object of the present invention to provide an improved system for auditorially rendering (i.e., speaking) a digitized representation of textual material.

It is another object of the invention to provide a listener with a complex comprehensible audio output of a textual expression.

It is still a further object of the invention to provide an audio formatting language (AFL) with which to manipulate the analogical markers and for controlling an audio output device such as a speech synthesizer.

It is yet a further object of the present invention to provide for a browsing capability in an audio document, so as to allow a listener to easily locate his or her position therein.

DISCUSSION OF THE RELATED ART

In the paper "Textalk" by T. V. Raman (published in *TUGboat*, Volume 12) March, 1991, the author outlines the problems of "speaking" digitized documents, especially documents in technical fields. The possibility of using existing markup commands in electronic documents to drive a voice synthesizer is also discussed.

In another paper, "An Audio View of (La)TeX Documents", by T. V. Raman (published in *The Proceedings of the TeX Users Group*, Volume 13, July 1992), the author proposes the idea of extracting high-level structure from documents marked up in TeX® or a similar markup language. In addition, the concept of generating of audio renderings, based on rules, is introduced. The concepts of audio cues in cooperation with spoken text is also discussed.

SUMMARY OF THE INVENTION

In accordance with the present invention there is provided a method for producing auditory renderings of digitized works and, in particular, digitized documents containing complex mathematical expressions. Documents are first entered into a computer system and formatted with a markup language, such as one of the TeX® or LaTeX® family of languages. The formatted documents are parsed to provide a tree-structured, high-level representation. Mathematical expressions are in quasi-prefix form. Lexical analysis and recognition processes are then undertaken. The resulting analyzed documents are provided to an audio output device (such as a voice synthesizer) operating under control of a set of predetermined rendering rules. The resultant audio signal contains not only textual content but also the analogical markings produced by the reading rules. Multichannel audio outputs may be used to allow for spatial placement capability, in addition to the other analogical markings. An audio formatting language (AFL) is provided to allow for manipulation of rendering rules. A browsing capability is also provided to allow a listener to easily locate his or her place in a document.

BRIEF DESCRIPTION OF THE DRAWINGS

A complete understanding of the present invention may be obtained by reference to the accompanying drawings, when considered in conjunction with the subsequent detailed description, in which.

DESCRIPTION OF THE PREFERRED EMBODIMENT

Generally speaking, the invention pertains to a new method for converting works in digitized form to an audio output. The audio output combines synthesized speech delivered with varying voice characteristics with non-speech sounds to annotate structural features of the work. The transformation from digitized text to audio output is under control of modifiable rendering rules created in a novel audio formatting language.

The process of entering documents into a computer system via keyboard or an OCR scanner into a computer system is well known. Simple documents are often entered using a class of software known as word processors. While word processors are adequate for simple text entry and printing tasks, they do not have the necessary features to enter or print complex mathematical expressions. A different, more powerful set of software tools known as markup languages has emerged during recent years. Typical of these markup languages is TeX® and its derivative languages (such as LaTeX®), property of the American Mathematical Society. For purposes of disclosure, TeX® will be used to refer to TeX® and derivative or similar markup languages.

In markup languages, special formatting commands may be inserted in the text stream. Such commands make the "typesetting" of complex mathematical expressions considerably easier. For example, simple inserted commands can accurately produce subscripts and superscripts, integral or summation operators, as well as the myriad of different mathematical symbols, Greek letters, type sizes and positions required to produce well-formed representations of mathematical expressions. Formatted documents using markup languages have become the universal form of the electronic exchange of technical information over networks linking educational institutions and industries.

Thus, increasing numbers of technical documents having extra-textual formatting information are widely available. Relying upon this, the present invention utilizes such embedded formatting information to create analogical markings in the audio domain. The terms "analogical markings" and "audio cues" will be used interchangeably herein. The inventive technique may be thought of as "acoustical typesetting". In the visual domain, typographical formatting (such as the high placement and small type size of a superscript) makes the reading and understanding of an equation by a reader easier; analogical markings perform a similar function in the audio domain for a listener.

Figure 1:
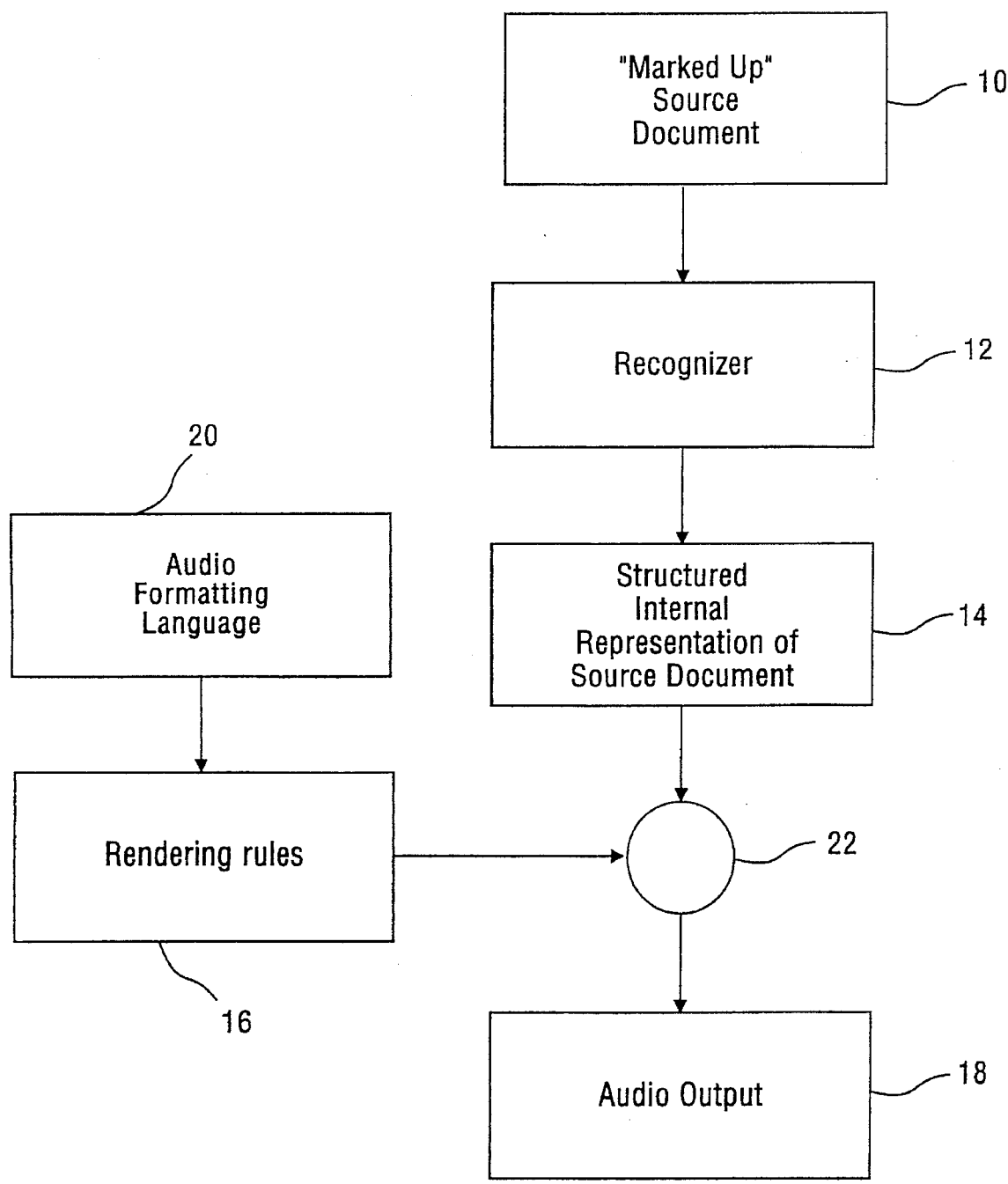
FIG. 1 is a flow chart of the method of the present invention.

Referring now to FIG. 1, there is shown a flow chart of the method of the present invention. A digitized source document 10 is marked up by a markup language such as TeX®. A recognizer 12 consisting essentially of a lexical analyzer and a recursive descent parser is provided. The operation of the recognizer 12 is described in detail hereinbelow. Recognizer 12 transforms source document 10 into a structured internal representation 14 structured essentially as a hierarchial tree. A set of audio rendering rules 16 are provided which operate upon the structured internal representation 14 by means of a audio formatter 22 to producing audio output 18. Both rendering rules 16 and the process whereby they act upon structured internal representation 14, are described in detail hereinbelow. An audio formatting language (AFL) 20 is provided to allow manipulation of rendering rules 16, thereby providing user control over audio output 18. AFL 20 is also described in detail hereinbelow.

Figure 2:
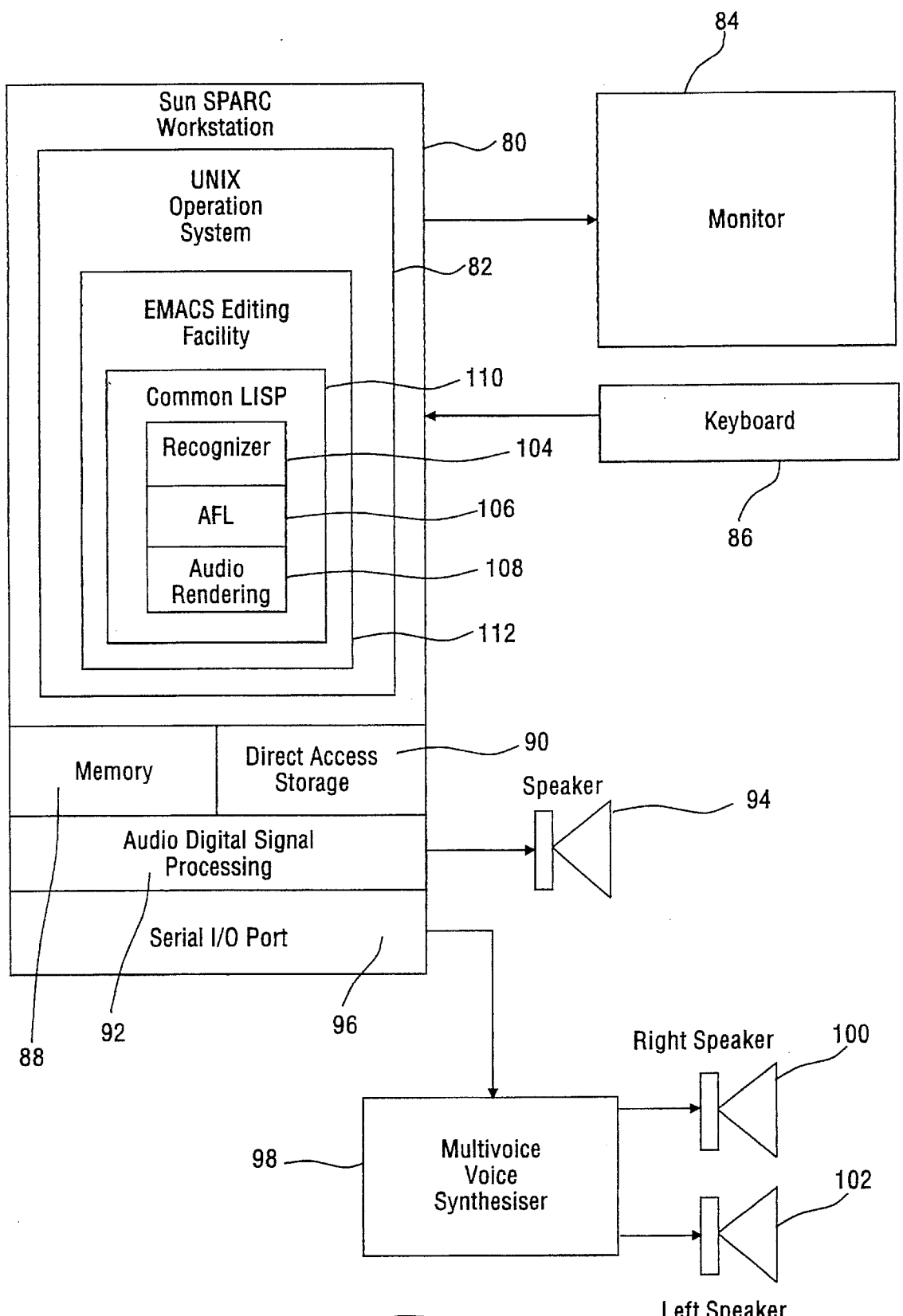
FIG. 2 is a system block of the hardware environment performing the method of the present invention shown in FIG. 1.

Referring now to FIG. 2 there is shown a block diagram of a typical hardware embodiment for implementing the method of the present invention. A SPARC® architecture work station 80 manufactured by Sun Microsystems, Inc., operating the UNIX® operating system 82, is shown. Workstation 80 is equipped with a monitor 84, keyboard 86, random access memory (RAM) 88 and direct access disk storage 90. In addition, SPARC® workstation 80 is equipped with an audio digital signal processor 92 (DSP) capable of providing an audio output to external speaker 94. Further, SPARC® workstation 80 is equipped with a serial input/output (SIO) port 96. Attached to SIO port 96 is a Multivoice, voice synthesizer 98, provided by the Boston Children's Hospital. Multivoice synthesizer 98 provides two audio outputs, one via line output jack (not shown), and one via a headphone jack (not shown) to speakers 100 and 102, respectively. Recognition software 104, audio rendering software 106 and AFL software 108 run under the Common LISP program 110 (an ANSI Standard version of the LISP language) provided by LUCID Corporation. LISP is called from within the EMACS® editor 112 software which, in turn, runs under the UNIX operating system 82.

The TeX® formatted document 10 (FIG. 1) is accessed in a computer system. Next, the "recognizer" 12 (a recursive descent parser written in the LISP programming language), is used to extract a high-level structure from the work. Content at several levels is captured, with emphasis on general document content, as well as mathematical content. The resultant structure is an attributed tree. For math objects, the tree is in the quasi-prefix form. The algorithm of recognizer 12 contains features to handle ambiguous cases. For example, sin 2x=2sin×cos x. The algorithm also utilizes a modified version of the conventional operator precedence approach.

The overall system for executing the method of the present invention is implemented in LISP with CLOS extension. CLOS provides object oriented programming enrichment to the LISP syntax. Because neither LISP nor CLOS contains appropriate tools such as lexical analyzers or parser generators a function called LISPIFY is created in LEX. LEX is a UNIX-based lexical analyzer-generator for converting LISP code to the "C" language. LISPIFY takes as an input a source document marked up by TeX® and returns a token list in a form acceptable to the recognizer 12. Given the TeX® input:

\begin{center}
This is a sample document
\end{center}
LISPIFY produces:
(center
"this" "is" "a" "sample" "document"".").

The recursive descent parser examines the token (i.e., center in this case) returned by LISPIFY and calls a token-specific function to process the remainder of the list. This technique in and of itself has proven adequate to handle document sections, enumerated lists and other textual content. Additional processing functions are required to process mathematical functions. Again, given the TeX® input:

$a+b$
LISPIFY produces:
(inline-math "a" "+" "b").

Converting such a list to prefix form is a simple exercise. Examples may be found in most programming textbooks. Each element of the list is a math object with content and attributes, but no children. This becomes clearer upon examining an expression containing terms such as:

$$X_{k-1}+X_k+X_{k+1}$$

The subscripts k−1, k and k+1, respectively, are attributes of math object x. Attributes k−1, k and k+1 are objects in their own right and, in turn, could themselves have attributes. This progression can proceed to any depth. The recognizer must deal recursively with object and attribute to whatever depth a particular mathematical expression demands. In other words, the attributes of each math object are collected and processed recursively. Thus, conversion of such a list to prefix form is no more difficult than processing the original a+b example.

Figure 3:
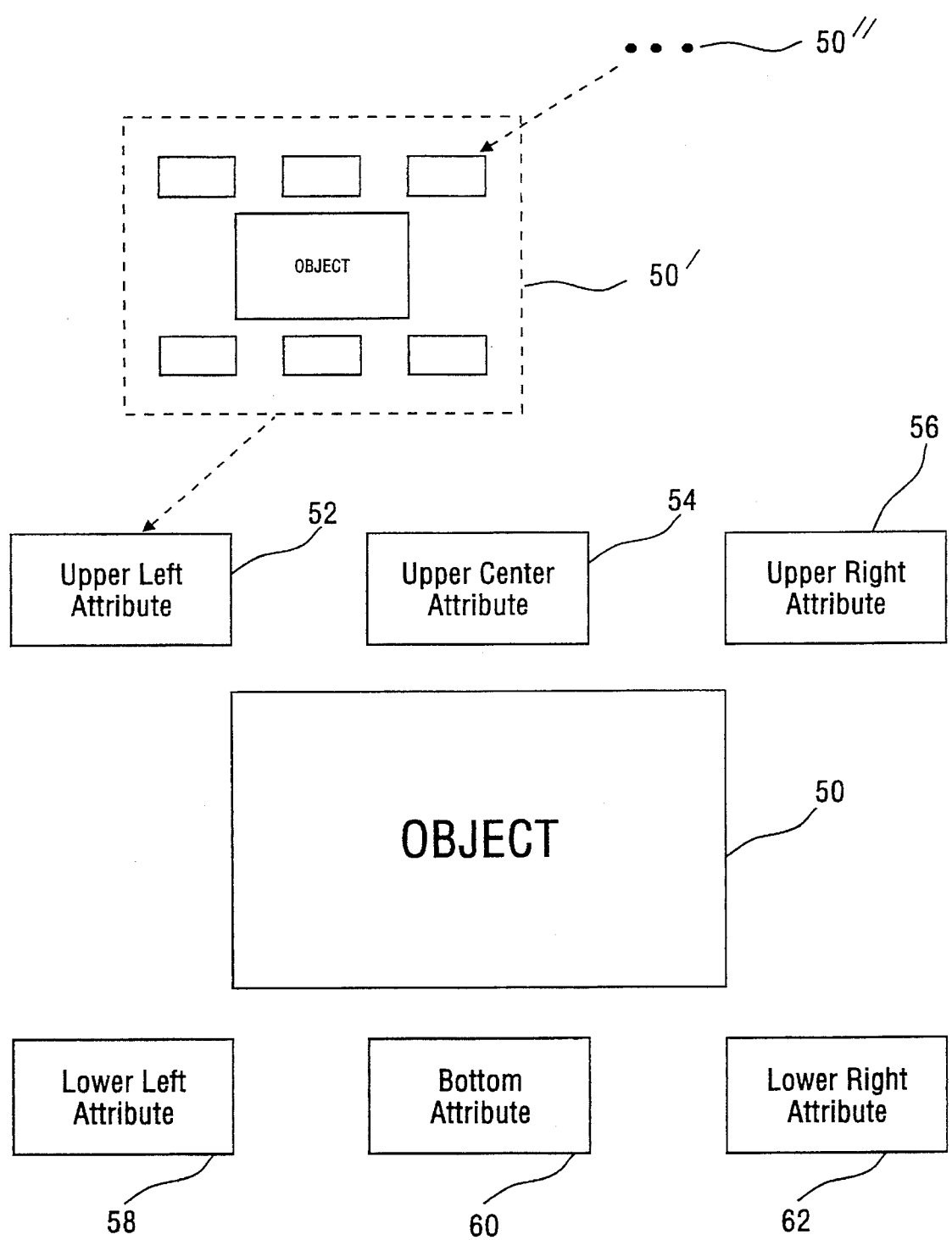
FIG. 3 is an illustration of the positional attribute relationship of a mathematical component depicted in transformed structure in accordance with the method of the present invention illustrated in FIG. 1.

Referring now to FIG. 3 there is shown a schematic representation of a math object and six possible attribute locations 52, 54, 56, 58, 60, 62. Most people are familiar with the upper right attribute 56, generally referring to attribute 56 as an exponent. Each attribute may be another object complete with its own set of six attributes as in upper left attribute 52 where object 50 may represent attribute 52. The process of replacing an attribute with another attributed object may be carried out to any required depth to describe a complex mathematical expression. The importance of the concept of attributed objects will be made clearer in the detailed discussion hereinafter.

It is necessary to extend the processing algorithm to handle ambiguous mathematical notation. Conventional parsing techniques fail, since written mathematics does not adhere to a rigorous set of precedence rules. Thus, the expression sin 2nπ means sin(2nπ), rather than sin(2)nπ. This is unexpected, since function application is normally assigned the highest precedence. What is more, sin a cos b means sin a*cos b, rather than sin(a cos b). Such anomalies are handled by the recognizer 12. The recognizer 12 uses precedence levels as shown in Table 1 hereinbelow. Note, however, that for purposes of brevity, that only a few representative operators are shown for each level of precedence.

TABLE 1

| Precedence of Mathematical Operators | | |
| --- | --- | --- |
| Level | Description | Examples |
| 0 | tex-infix-operator | \over |
| 1 | math-list-operator | ' |
| 2 | conditional-operator | " |
| 3 | quantifier | \forall |
| 4 | relational-operator | = |
| 5 | arrow-operator | → |
| 6 | big-operator | Σ |
| 7 | logical-or | ∨ |
| 8 | logical-and | ∧ |
| 9 | addition | + |
| 10 | multiplication | * |
| 11 | mathematical-function | sin |
| 12 | juxtaposition | ab |
| 13 | unary-minus | ¬ |

Precedence rules alone are not enough to handle written mathematics. Consequently, the algorithm is adapted by applying heuristics as follows.

The big operators (e.g., Σ and ∫) are treated as unary. Everything up to the next operator of lower precedence than the operator is considered part of the operand of the big operator. Thus, in the expression $$\sum_{\substack{1 \leq i \leq p \\ 1 \leq j \leq q \\ 1 \leq k \leq r}} a_{ij}b_{jk}c_{ki} = 1$$

Everything up to the = sign is treated as the summand. This technique is particularly useful in recognizing expressions such as $x+\Sigma_i a_i=0$. Using the heuristic, the summation is correctly recognized as the second argument to the + sign. Further, the summand is terminated by the = sign. Finally, the expression is now equivalent to recognizing a+c=0, which can be handled by the standard algorithm.

The integral operator can have an optional delimiter as in $$\int_1^\infty f\,dx.$$

If the $_{dx}$ is present and is recognizable (i.e., has been marked up as--x--as opposed to $_{dx}$), it is recognized as the closing and the variable of integration $_{(x)}$ is inferred. However, this closing delimiter may not always be present; it may be encoded ambiguously as in $\int f dx$; or the integral itself may not require a closing $_{dx}$ as in ∫f. In the former case, the recognizer treats the juxtaposition ∫ $_{dx}$ as the integrand. Though this may seem incorrect, it is, in fact, exactly what the typeset output means. In the latter case (i.e., ∫$_f$), the earlier rule that treats the operand of a big operator to be everything up to the first operator of lower precedence applies. Hence, x+∫$_f$=0 may be correctly recognized.

The closing delimiter $_{dx}$ is treated as such, only if it occurs at top level. Thus, in $\frac{\dx}{x}$, the \dx does not end the integrand. This allows correct recognition of such integrals. However, the variable of integration may not be inferred. There seems to be no clear solution for this problem. Written mathematical notation relies on the fact that dx means 1.dx and the integrand is therefore 1/x.

Function application is treated as right-associative. This results in sin a cos b being interpreted correctly. Since juxtaposition has been assigned a higher precedence than function application, sin a cos b continues to be recognized correctly. The following equation is an example of such ambiguous notation:

2 sin 2n π cos 2n π=sin 4n π

Notice the complete absence of parenthesis in the above expression. The recognizer 12 also has built in the macros dx and dy as special cases.

In written mathematics, delimiters do not always match. Thus, the expression [0,1] denotes a semi-open interval. There are also cases where there is no matching closing delimiter. When the recognizer 12 sees an open delimiter, it scans forward for the first matching close delimiter of the same kind. If one is found, then all of the input up to this point is treated as the delimited expression. If no matching close delimiter of the same kind is found, the first unmatched close delimiter is then located and used to delimit the input. Otherwise, such occurrences are treated as unmatched delimiters.

The character ! is one of the few post fix operators used in written mathematics. This is also treated as a special case, and the recognizer confirms that the ! is indeed a factorial sign by making sure that it does not have any attributes. Thus, $!_k$ is not considered a factorial symbol.

All discussion so far has assumed that a source document has been marked up in TeX® for the sole purpose of typesetting, (i.e., creating a formatted printed output). The method of the present invention allows the use of the TeX® macro feature to add additional markup commands not usually a part of the TeX® system. These macros are useful to an author for providing an unambiguous mark up of a source document or "abstracting" repetitive layout details. The presence of these new markup commands presents potential difficulty to the recognizer 12 of the inventive method. Any difficulties are overcome by defining TeX® user-defined macros as new object types processable by the recognizer 12. The new object type added as macro-generated markup commands to TeX® must first be well defined within the recognizer 12. This definition is created using the command "define-text-objects". The new object must be assigned class, processing function(s) and accessor method(s). Marked up document 10 including TeX® user-defined macros may the be less ambiguously rendered auditorially, (i.e. customized reading styles may be easily defined for a TeX® user-defined macro).

Experience gained in recognizing document structure from electronic markup has led to the formation of guidelines for unambiguously encoding documents. A document 10 adhering to these guidelines makes recognition easier. The resultant document is then available for more than one potential use. The same set of visual rules may be used in more than one context. For example, the stacking of a mathematical object above another separated by a horizontal rule might be used in several contexts.

Fraction: $\dfrac{1+\sqrt{5}}{2}$

Induction statement: $\dfrac{\overline{P(0)} \quad \dfrac{x:N, P(x)}{P(S(x))}}{\forall x:N \cdot P(x)}$ Inference rule: $\dfrac{X=Y, Y=Z}{X=Z}$ An author could encode (mark up) any of the above examples in an identical manner in TeX®. The various occurrences should be marked up distinctly when an author wishes to use the same markup to mean different things. This is easily done by defining macros in the markup language as discussed hereinabove. For example, macros to handle three examples might be:

1. \newcommand{\fraction}[2]{\frac{#1}{#2}}.
2. \newcommand{\induction_clause}[2]{\frac{#1}{#2}}.
3. \newcommand{\inference}[2]{\frac{#1}{#2}}.

Unique, in-context renderings of these three examples can be allowed with the method of the present invention.

Visual math notation is notoriously ambiguous. Most expressiveness is obtained by freely overloading standard layout operators. While it may not be possible to attach exact semantic meaning to every object occurring in a document, variegated encoding should be employed for similar visual objects having different meanings.

Figure 4:
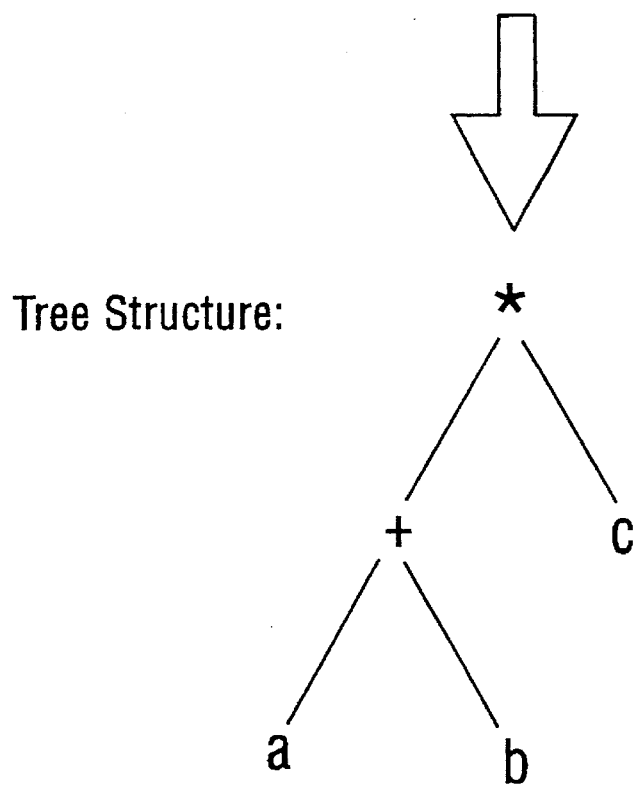
FIG. 4 is an illustration of quasi-prefix type hierarchial tree structure in accordance with the method of the invention, as illustrated in FIG. 1.

Refer now to FIG. 4 where there is shown generally at reference numeral 30, a simple mathematical expression. Expression 30 is in a normal infix format, generally familiar to most people. Expression 30 may be rewritten in a prefix form yielding expression 30'. The recognizer 12 (FIG. 1) of the method of the present invention converts mathematical expressions, of which expression 30 is a typical example, into a tree structure shown generally at reference numeral 32. The form of expression 30' and it's representation in tree structure 32 is referred to as quasiprefix form.

The document structure and context captured by the recognizer 12 are next acted upon by a set of audio rendering rules 16 (ARRs). The ARRs 16 are written in the audio formatting language (AFL) of the present invention. Just as a typesetting language provides a language for the creation of visual rendering rules, the AFL provides the necessary language for creation of ARRs 16. The ARRs 16 manipulate the audio formatter; therefore the logical device that controls the audio outputs 18 from the reading system.

The audio formatter 22 (FIG. 1), which acts upon structured document 14 in cooperation with the rendering rules, is said to have state. The quality of voice used, the speed of speech, the pitch of the voice, the types of sounds generated, etc., are all determined by the current state of the audio formatter 22. The overall state of the formatter 22 is made up of individual states (such as the speech state, etc.) AFL is implemented as an extension to COMMON LISP.

Figure 5A:
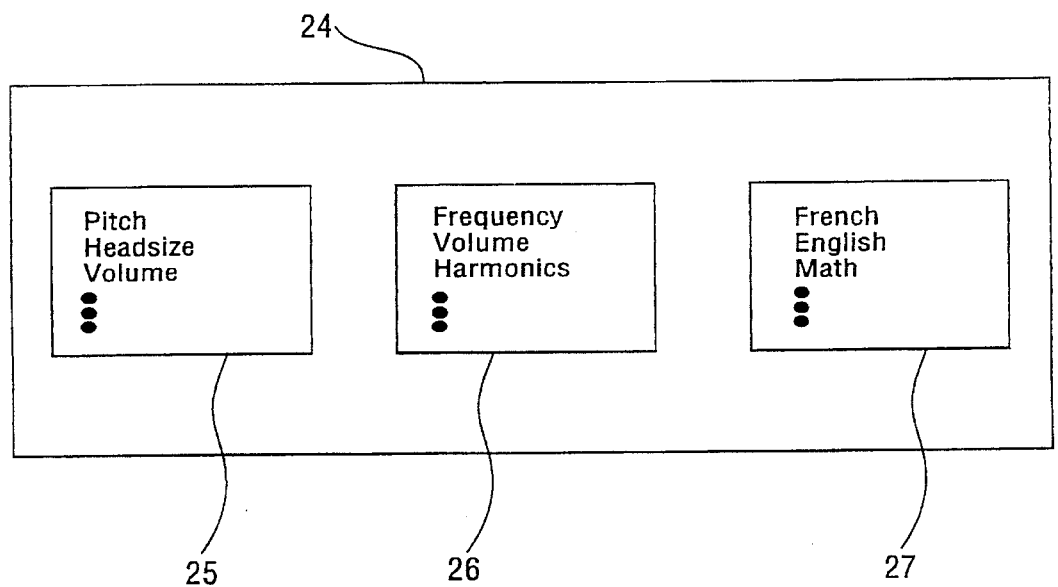
FIG. 5a is a diagram illustrating the audio space and it's component sub-spaces

Each state may be thought of a an n-dimensional space. The overall state or the audio state of formatter 22 consists of sub-spaces. Referring now to FIG. 5a there is shown a diagram showing audio space 24 and three of many possible component sub-spaces 25, 26 and 27. Each sub-space 25, 26 or 27 consists of an n-dimensional space.

Figure 5B:
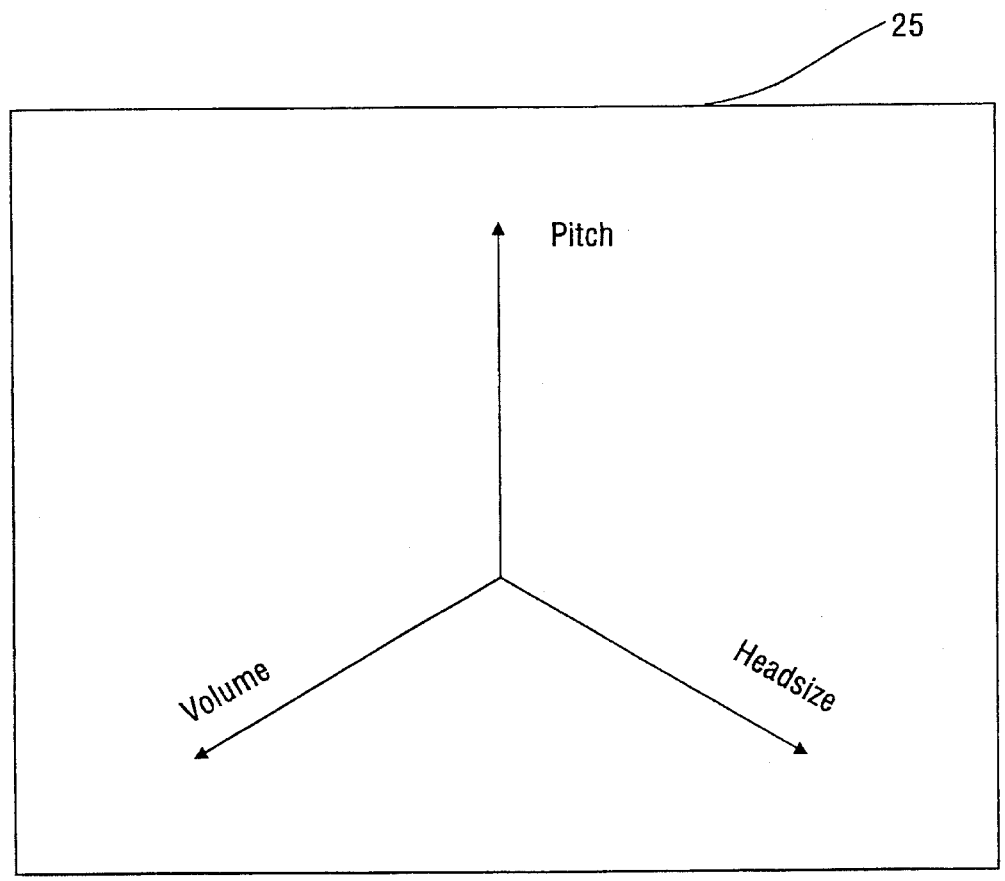
FIG. 5b is a diagram illustrating the n-dimensional speech component sub-space of the audio formatter of the present invention depicted in FIG. 1.

The component 25 of space 24, representing speech, is characterized by pitch, headsize, volume, etc., as also shown in Table 2. Referring now to FIG. 5b, there is shown a diagram representing three of n possible orthoginal axes which comprise sub-space 25 (FIG. 5a)

TABLE 2

Implemented Multivoice Parameters

| Dimension | Min | Max | Initial | Step | Units |
|---|---|---|---|---|---|
| Speech Rate | 120 | 550 | 180 | 25 | Words/min. |
| Volume | | | | | |
| left volume | 0 | 100 | 50 | 5 | decibels |
| right volume | 0 | 100 | 50 | 5 | decibels |
| Voice Quality | | | | | |
| breathiness | 0 | 100 | 0 | 10 | decibels |
| lax-breathiness | 0 | 100 | 0 | 25 | percent |
| smoothness | 0 | 100 | 3 | 20 | percent |
| richness | 0 | 100 | 70 | 10 | percent |
| laryngilization | 0 | 100 | 0 | 10 | percent |
| Pitch and Intonation | | | | | |
| baseline fall | | | 18 | 10 | hertz |
| hat-rise | | | 18 | 10 | hertz |
| stress rate | | | 32 | 20 | hertz |
| assertiveness | 0 | 100 | 100 | 25 | percent |
| quickness | 0 | 100 | 0 | 10 | percent |
| avergae pitch | | | 122 | 10 | hertz |
| pitch range | 0 | 100 | 100 | 10 | percent |

The other components 26 and 27, respectively, represent other spaces in the audio space 24.

Referring now to FIG. 5(b), three of "n" multiple, orthogonal axes of speech component 25 are shown. Each axis represents a dimension of component space 25 in an audio space 24. The three dimensions chosen for illustrative purposes are pitch, headsize and volume, which appear in the speech component space 25. Similar axes may be drawn for dimensions in the sound component space 26, or the pronunciation component space 27. The concept of spaces, dimensions and components are thus illustrated.

In the current generation of voice synthesizer products, the user has wide control over the quality of the outputted voice. Using the multivoice voice synthesizer 98, a user may select one of nine pre-programmed voices with names such as "Perfect Paul", "Uppity Ursula" and "Whispering Wendy". Table 2 lists several controllable parameters of the Multivoice device.

As may readily be seen, many parameters are controllable by the user. Heretofore, control of these parameters was difficult. One part of the inventive system is an audio formatting language (AFL), which makes control of these parameters both easy and semi-automatic.

The major LISP-CLOS functions, macros and methods forming AFL, that are common to all of the components of AFL, are hereinbelow described.
new-block &body <body>[MACRO]

This is the AFL block macro. It introduces a local instance of variable *current-speech-state*. This instance is set to the instance of *current-speech-state* that was referenced just before execution of the block, and body is executed within this new local scope. Within the block, all (free) occurrences of *current-speech-state* refer to the new local variable. Upon termination of the block, local variable *current-speech-state* is destroyed, and the state of the underlying hardware is reset to its pre-existing state.
terminate-block [FUNCTION]

The terminate-block function causes the currently-executing AFL block to terminate immediately. A browser can execute this statement when the audio rendering of an object is to be prematurely terminated because of an interrupt from the user.
local-set-state <new-state> [GENERIC FUNCTION]

The local-set-state function sets AFL local state to new-state. The type of new-state determines which state component is set. Individual component spaces provide methods that set their own state.
global-set-state <new-state> [GENERIC FUNCTION]

The global-set-state function sets AFL global state to new-state. The type of new-state determines which state component is set. Individual component spaces provide methods that set their own state.

Some representative component subspaces of AFL are herein described. Each component subspace provides methods of the generic functions corresponding to the AFL assignment statements. The AFL total audio space is the cross-product of the AFL component subspaces. Its state variable is an n-tuple made up of the state variables of the component subspaces.
initialize-total-space [FUNCTION]

The initialize-total-space function provides total initialization of the AFL total audio space. It creates the variables *current-total-audio-state* and *global-total-audiostate*
*current-total-audio-state* <nil> [Variable]

This is a variable storing the AFL total state within the current local scope. It is initialized to a nil value.
*global-total-audio-state* <nil> [Variable]

This variable stores the AFL total state within the global scope. It is also initialized to a nil value.

Functions are also provided for initializing AFL's speech component, i.e., the speech space.
initialize-speech-space &optional (voice*default-voice*) [FUNCTION]

This function initializes the AFL speech space by setting up local and global speech state variables. Optional argument "voice" is the name of a point in speech space to which these variables should be initialized. The default is *default-voice*.
*default-voice* 'paul [VARIABLE]

This variable contains the name of default voice used to initialize speech space.
*global-speech-state* <nil> [VARIABLE]

This variable records the global speech state of AFL. It is initialized to a nil value.
*current-speech-state* <nil> [VARIABLE]

This variable records local speech state of the audio formatter. It is also initialized to a nil value.
re-initialize-speech-space optional (voice *default-voice*) [FUNCTION]

This function reinitializes the AFL speech space with "voice" the name of a point in the AFL speech space In addition to these functions and variables, operators and methods are provided to effect changes in the AFL sound or speech spaces. The AFL speech space operators are described below. These speech space operators do not cause any side effects.
move-by (point point-in-speech-space) dimension offset &key (slot 'value) [METHOD]

This method returns to the point reached by moving from a starting point along a specified dimension by the amount of offset. The default result is to change the dimension value. If called with :slot 'step-size, this operator only modifies the step size.
step-by (point point-in-speech-space) dimension number-of-steps &key (slot 'value) [METHOD]

The step-by method returns the point reached by moving from a starting point by number-of-steps along a specified dimension. The default operation is to change the dimension value. If the operator is called with :slot 'step-size, it only modifies the step size instead.
move-to (point point-in-speech-space) dimension value &key (slot 'value) [METHOD]

This method return point is reached by moving from a starting point along a specified dimension to value. If it is called with :slot 'step size, this operator only modifies the step size.

scale-by (point point-in-speech-space) dimension scale-factor &key (slot 'village [METHOD]

This method returns the point reached by scaling value along a specified dimension by scale-factor. If the operator is called with :slot 'step size, then it only modifies the step size.

multi-move-by (point point-in-speech-space) &rest settings [METHOD]

This operator moves from a starting point along several dimensions whose settings are specified as dimension value pairs.

multi-move-to (point point-in-speech-space) &rest settings [METHOD]

This operator moves from a starting point along multiple dimensions whose settings are specified as dimension value pairs.

multi-scale-by (patent point-in-speech-space) &rest settings [METHOD]

This operator returns the result of scaling point along multiple specified dimensions whose settings are specified as dimension value pairs.

multi-step-by (point point-in-speech-space) &rest settings [METHOD]

This operator returns the result of stepping along multiple specified dimensions from point, with settings specified as dimension value pairs.

generalized-afl-operator (point point-in-speech-space) &rest settings [METHOD]

This method operates on a specified point and returns the result. The settings are a list of triples consisting of operation, dimension and value.

set-final-scale-factor dimension scale-factor [FUNCTION]

This function sets the AFL final scale factor to the specified dimension. Final scaling is applied before producing output.

Several functions which produce or modify speech events are now described.

pause <milliseconds> [FUNCTION]

This function causes a pause of the specified number of milliseconds to be inserted in the text output stream.

send-text <text> [FUNCTION]

This function sends text to the speech device. speak-number <number-string> [FUNCTION]

This function sends argument number-string to the speech device.

force-speech [FUNCTION]

This functions forces speech immediately. It is used when speech is to be produced before a sentence end marker or time-out has been sent.

with-surrounding-pause <pause-amount &body body > [FUNCTION]

This function executes "body" with the surrounding pause specified by pause-amount.

Another category of functions provided as part of the AFL syntax creates prosodic events. These functions and macros are now described.

comma-intonation [FUNCTION]

This function generates a comma intonation. This intonation applies to the clause last sent.

period-intonation [FUNCTION]

This function generates a period intonation. This intonation applies to the clause last sent.

interrogative [MACRO]

This function generates an interrogative intonation which is applied to the last clause sent.

exclamation [FUNCTION]

This function sends an exclamation intonation which is applied to the last clause sent.

exclamatory-stress [FUNCTION]

This function sends exclamatory stress which is applied to the next phrase to be sent.

primary-stress [FUNCTION]

This function sends primary stress which is applied to the next phrase to be sent.

secondary-stress [FUNCTION]

This function sends secondary stress which is applied to the next phrase to be sent.

subclause-boundary [FUNCTION]

This function inserts a subclause boundary which is applied to the next phrase to be sent.

high-intonation [FUNCTION]

This function generates H*, rising intonation which is applied to the next phrase to be sent.

low-intonation [FUNCTION]

This function generates L*, falling intonation which is applied to the next phrase to be sent.

high-low-intonation [FUNCTION]

This function generates Hl*, rise and fall intonation which is applied to the next phrase to be sent.

paragraph-begin [FUNCTION]

This function begins a paragraph by sending rising pitch. This applies to the next phrase to be sent.

Functions are provided to save and otherwise manipulate points in the AFL speech space. Other functions manipulate dimensions. They are now described.

define-standard-voice <name &rest settings> [FUNCTION]

This function defines a standard voice named "name" specified by "settings", which is a list of dimension value pairs.

get-point-in-speech-space <name> [FUNCTION]

This function returns a predefined point named "name".

list-of-speech-dimensions [FUNCTION]

This function returns a list of speech space dimension names.

minimum-value <dimension> [FUNCTION]

This function retrieves the minimum value for the requested dimension.

maximum-value <dimension> [FUNCTION]

This function retrieves a maximum value for the requested dimension.

dimension-range <dimension-name> [FUNCTION]

This function returns the difference between the maximum and minimum values for the specified dimension.

length-of-subinterval <dimension-name, number-of-endpoints> [FUNCTION]

This function computes the length of a sub-interval when the specified dimension is subdivided into number-of-endpoints −1 sub intervals.

Functions, variables and methods affecting the non-speech audio component are now presented.

initialize-audio-space [FUNCTION]

This function initializes the non-speech space. It creates and initializes the necessary local and global variables to appropriate default values.

*global-audio-state* <nil> [VARIABLE]

This variable stores the global state of non-speech audio component.

*current-audio-state* <nil> [VARIABLE]

This variable stores the local state of the non-speech audio component.

select-sound (point point-in-audio-space) (sound string) [METHOD]

This operator returns a point with this "sound" selected. "Sound" is the name of a sound-file.
select-sound (sound string) (point point-in-audio-space) [METHOD]
    This operator returns a point with this sound selected. "Sound" is the name of a sound file.
switch-on (point point-in-audio-space) &key (synchronize nil) [METHOD]
    This operator returns a new point with its switch turned on. It executes asynchronously by default. It is called with :synchronize t to synchronize with other ongoing events.
switch-off (point point-in-audio-space) &key (synchronize nil) [METHOD]
    This operator returns a new point with its switch turned off. It executes asynchronously by default. It is called with :synchronize t to synchronize with other ongoing events.
toggle-switch (point point-in-audio-space) &key (synchronize nil) [METHOD]
    This operator toggles the switch of the selected point and returns the new point with its switch toggled. It executes asynchronously by default. It is called with :synchronize t to synchronize with other ongoing events.
play-once (point point-in-audio-space)
    This operator plays the sound once.
move-to (point point-in-audio-space) dimension value &key &allow-other-keys [METHOD]
    This operator moves from a specified point to value along a specified dimension.
run-program-play-file &key (volume 1) (port :h) (immediate nil) (wait nil) (filename *default-sound-filename*) [FUNCTION] The run-program function "plays" a file. The C language executable "Play" is called with the appropriate arguments. Keyword arguments determine its behavior. Volume specifies the volume (output sound level) to use and is an integer between 0 and 100. Port is either :h or :s and sends the output to either the headphone or speaker port respectively. Immediate is a boolean, t. If t is true, the command should wait until the audio device is free. Wait is a boolean which specifies if the command executes synchronously. If wait is true, the function does not return until the sound has been played. Filename specifies the sound file that is to be played.
synchronize-and-play sound file &key (background-flag nil) [FUNCTION]
    This function waits until talking is stopped and then plays a sound file. If background-flag is true, then the sound is played in the background.
    Additional functions from the AFL-based system of reading rules for processing the internal structured document are shown below.
define-cardinal-number <string cardinal> [FUNCTION]
    This function defines "cardinal" as the cardinal number that corresponds to the parameter "string-cardinal". For example: (define-cardinal number 1 "first").
cardinal-number <object> [GENERIC FUNCTION]
    This function returns a cardinal number for parameter "object". For example: given the number 1 or the string "1" this function returns the string "first". Cardinal numbers are defined by the define-cardinal-number function.
weight <object> [GENERIC FUNCTION]
    This function computes the weight of an object. Weight is a complexity measure used to compare mathematical objects.
balanced-tree-p (math-object math-object) [METHOD]
    This operator returns true if the tree rooted here is balanced, i.e., all the children have the same weight. Reading rules and styles.

read-aloud object [GENERIC FUNCTION]
    Function read-aloud renders parameter "object" in audio. An around method on this function for the principal object type and document calls the currently active rule for "object". Primary methods on read-aloud for object serve as default reading rules. Rendering rules should use read-aloud rather than a reading rule by name to render sub-objects, unless a specific reading is to be "hard-wired" into a reading rule.
current-reading-style [FUNCTION]
    This function returns the name of current reading style.
activate-style <style> [FUNCTION]
    This function activates "style" as the current reading style.
add-reading-style <style> [FUNCTION]
    This function adds style to the end of the list of currently active reading styles.
deactivate-style <style> [FUNCTION]
    This function deactivates "style".
activate-rule <object-name, rule-name> [FUNCTION]
    This function activates rule "rule-name" for object "object-name".
deactivate-rule <object-name> [FUNCTION]
    This function deactivates the currently active rule for object "object".
active-rule (document document) [METHOD]
    This operator returns the name of any explicitly activated rule for object "object".
reading-rule <object-name rule-name> [GENERIC FUNCTION]
    This function defines a new named reading rule (rule-name) for the specified object name. Object-name is the name of a document object type. Rule-name is a symbol that names the rule. Reading rules methods on this generic function specialize on both object type and rule name.
def-reading-rule (object-name rule-name) &body body [MACRO]
    This macro provides a transparent interface to the underlying implementation of reading rules. Object-name names the object type; rule-name is the name of the reading rule; and body is the body of the reading rule. This macro expands to the appropriate method on generic function reading-rule.
rem-reading-rule <class, rule-name> [MACRO]
    This macro removes the specified reading rule name. This macro provides an easy-to-use interface to the underlying CLOS function remove-method.
trace-reading-rule <class, rule-name> [MACRO]
    This macro traces the specified reading rule. This macro provides an easy-to use-interface to the underlying CLOS function remove-method.
doc-reading-rule <object-name, rule-name> [MACRO]
    This macro returns documentation for the selected reading rule named rule-name for object type object-name. Arguments object-name and rule-name are not evaluated.
turn-on-special-pattern <object-name> [FUNCTION]
    This function turns on the specified special patterns for object type object-name. If special patterns are turned on, when a known special pattern is seen and reading style use-special-patterns is active, then a rule appropriate for this context is used.
turn-off-special-pattern <class-name> [FUNCTION]
    This function undoes the effect of calling turn-on-special-pattern.
special-pattern <object> [GENERIC FUNCTION]
    This function defines the special patterns that should be looked for when processing object. Methods on this function for specific object types specify such patterns in the form of a case statement, with one case for each pattern to be identified for that object type. Reading rules that should be applied when special patterns are seen can be defined. Example: If we specify 'half as the special pattern for ½, then we can define a reading rule named 'half for object math-object. Activating style use-special-patterns and then executing turn-on-special-pattern with appropriate arguments results in the newly defined reading rule being used, when rendering expressions containing ½.

The principle of analogical marking employed in the present invention takes advantage of the high degree of control available via the AFL to create acoustical equivalents of visual formatting. For example, a superscript is printed above the line and is in smaller type than the number to which it refers. When the text expressing a superscripted quantity is spoken, the superscript itself may be presented in a high-pitched voice. Carrying the analogy one step further, the spoken level of the voice could also be reduced and, in a multichannel system (i.e., a two-channel "stereo" system or more), the superscript itself could be presented spatially slightly to the right of the superscripted quantity.

A series of statements is defined in the AFL extension to COMMON LISP, as summarized below.
(initialize-speech-space)

This statement assigns default values to a *current-speech-state* and a *global-speech-state* global variable.
(local-set-state <point>) and (global-set-state <point>)

These statements respectively assign parameter <point> to the *current-speech-state* and *global-speech-state* variables.
(set-final-scale-factor <dimension> <value>)

This command allows the scaling of an audio rendering in a manner similar to the global formatting command included in TeX® for visual scaling of a printed output.

A series of parameters having a one-to-one mapping per the dimensions of Table 2 hereinabove is implemented. For example, Speech Rate is implemented as afl:speech-rate, baseline fall as afl:baseline-fall, etc. As an example, executing the statement:

(set-final-scale-factor afl:speech-rate 2) causes subsequent speech to be heard at twice the previous rate.

In additional statements, AFL includes four expressions that allow movement in the speech space. These are described below.
(move-by <point> <dimension> <offset>)

This expression yields a state <point> that is the same as state, except that offset has been added to dimension. For example, the following statement adds 50% to the assertiveness of Paul:

(move-by 'paul afl:assertiveness 50).
(scale-by <point> <dimension> <factor>)

This expression yields state <point> with the value of <dimension> multiplied by <factor>.
(move-to-point <dimension> <value>)

This expression yields state <point> with the value of <dimension> set to <value>.
(step-by <point> <dimension> <steps>)

This expression yields state <point> with the value for <dimension> changed. Each dimension has a default step size (see Table 1) which specifies the minimum move within that dimension to achieve a perceptible auditory change. Using the step-by command allows changing a dimension by a multiple of the default step size for that dimension, for example:

(step-by afl:average-pitch −1.5).

A series of speech-generation statements is also provided. These are summarized below. Their usage should be self-explanatory.

| | |
|---|---|
| (send-text <text>) | |
| (speak-number <number>) | |
| (force-speech) | (force speech when normal sentence-end marker has not been recieved) |
| (pause-milliseconds) | |
| (subclause-boundary) | |
| (comma-intonation) | |
| (exclamation) | |
| (interrogative) | |
| (high-intonation) | (rising intonation) |
| (low-intonation) | (falling intonation) |
| (high-low-intonation) | (rising and falling intonation) |
| (primary-stress) | (primary stress marker) |
| (secondary-stress) | (secondary stress marker) |
| (exclamatory-stress) | (exclamatory stress marker) |

In general, an audio output may consist of any number of speech and non-speech components. In the method of the present invention, each speech or non-speech component must exist as a named component of the audio formatter. The tools for the manipulation of the speech state space have already been described. Tools for the manipulation of non-speech state spaces will be described in detail hereinbelow. Two additional global variables, *current-total-audio-state* and *global-total-audio-state*, are used to store a total local and global audio state respectively. The AFL statements and expressions described in the context of a single state space are extended to work in total audio state space. When the audio output comprises multiple components, synchronization of the individual state spaces with each other becomes critical. The AFL provides for such synchronization.

The various components of the audio formatter may have separate threads of control. The AFL provides constructs to synchronize events occurring on the multiple components. For example, on a typical audio formatter having speech synthesis and sound components, repeatedly playing a certain sound on the sound component may be desired while certain actions are simultaneously executing on the speech component. An AFL language block should not terminate until speech commenced from inside that block has been completed.

AFL events are of two types:

1) simple events that execute an action at once, executed by statements such as "read-aloud"; and 2) events that repeatedly execute an action within a "loop-forever" statement.

An AFL block terminates only after all simple events commenced within the block have terminated. Before a block terminates, any "loop-forever" events commenced within that block are first aborted.

Components having a "loop-forever" event executing are said to be busy. AFL constrains any event on an audio component to terminate in the same block within which it commences. It is not possible to commence an event, terminate the block and have the event continue. Two tables are used to record busy components. Table busy-table has one entry per audio component. All entries in busy-table are initially false. Table busy-table has global scope. It is available to all processes within the audio formatter system. When a "loop-forever" event is started on a component, the corresponding busy-table entry for that component is set to true. Once a component has become busy, no other event may be executed on it, but its current state (for example, the pitch) may be changed.

When a block terminates, only "loop-forever" events commenced from within the block should be aborted. To allow this, AFL includes an additional table, the local-busy table. As with the busy-table, the local-busy-table contains one entry per component; each entry is initialized as false. When terminating a block, entries in the local copy of local-busy-table are checked to determine the components that must have "loop-forever" events aborted. The following steps are performed in sequence when terminating a block:

1) Wait for completion of events on components whose busy-table entry is false.

2) Abort ongoing events on components whose entry in the local-busy-table is true. The local-busy-table entry must then be reset to false.

Non-speech components of the audio formatting are relied upon for all audio outputs expect speech itself. These audio outputs include analogical marking, auditory annotation and spatial placement considerations. The primary component for these outputs is the sound component of the audio formatter. This sound component relies on two state variables for the audio state space: *current-audio-state* and *global-audio-state*. These perform identical functions in the audio state space, as did the *current-speech-state* and *global-speech-state* variables previously defined for the speech state space. The audio state space is harder to define than the speech state, because quantitatively more and wider variations are possible than within the speech state space. It is therefore important to restrict the state space size to manageable limits. Again, the number of dimensions possible in the audio state space is ultimately dependent upon the actual audio formatter used in the implementation of the inventive method. For purposes of disclosure, only digitized sounds are employed; also, the limitations of SPARC audio with its single-channel audio output have been imposed. Implemented dimensions include:

Amplitude of sound

Pitch (fundamental frequency)

Frequency of different harmonics

Attenuation of resonance

Directionality

Primitives are needed to manipulate the sound state space in a manner similar to the statements and expressions used to manipulate the speech state space as described hereinabove.

The play-once primitive is used to synchronize sound outputs with text outputs from the audio formatter. It waits for the completion of all other pending events in the audio formatter before executing the next event. The event executed by the play-once primitive may be either synchronous or asynchronous in nature. In either case, the duration of the event being executed is specified, either explicitly as a time unit or implicitly by the nature of the event.

Another primitive, the play-until-told-to-stop primitive, is implemented using LISP's loop-forever command. Consequently, the duration of a play-until-told-to-stop event is controlled by the occurrence of other events. The "loop-forever" event will not terminate until aborted at the termination of the code block executing the event.

If the sound state space is continuous, movement along the defined dimensions could be controlled by a move primitive such as was defined for the speech state space. In the implementations chosen for the purpose of disclosure, the sound space is allowed to be discontinuous (i.e., to consist of a set of discrete distinguishing points in the space). Selection of one of the discrete points in the space is made with the select-sound primitive.

The non-speech components of the method of the present invention have been implemented using the Lucid Multitasking Facility. It also uses the Lucid extensions (Lucid, Inc., Menlo Park, Calif.) to COMMON LISP for interfacing with existing UNIX® utilities and routines written in the C programming language.

Object audio-player is used to provide an abstraction barrier between the external interface to the sound space and the underlying implementation. The audio-player consists of a sound to be played, a function to play the sound, and a switch to turn the sound on and off. Once an audio-player object has been created, its sound can be changed; it can also be turned on and off, using its switch. The external interface to the sound space maps points to the state of the underlying audio-player. The audio-player object is thus the underlying hardware for the sound component of the audio space. One audio-player can exist for each audio component subspace. The audio-player object is flexibly so that it can be utilized with other, sound generation software. Given a function f that generates sound when called with argument 5, an audio-player can be created with function f and sound 5 to create a uniform interface to the underlying sound generation software.

AFL blocks and assignments are used to manipulate the external representation of the state of the subspace. The underlying hardware representation (in this case, the audio-player) is automatically updated by the implementation.

The audio-player object allows the use of other sound generation tools with little modification to either the object or the primitives. PLAY-NOTES is a simple C program that plays a short beep when called with a set of arguments. A foreign function interface to this C function provides the LISP counterpart:

(play-notes &key(volume length tone decay octave))

To create an audio-player that uses the above function to generate sounds, the following function may be written:

```
(setf *play-notes* (make-instance 'audio-player
        :function #'play-notes
        :sound (list :octave "5c" )))
```

This object may now be turned on or off, or the note that is played may be changed by executing:

```
(Setf (player-sound *play-notes* )
        (list :octave "6c"))
```

Finally, a new component space may be implemented around this audio-player object, called the play-note-space. The play-note-space has local state and may be manipulated using AFL constructs.

Another aspect of the audio formatter deals with word pronunciation. How a word is pronounced depends on the type of text being read. For example, when reading mathematics, it is important to say "cap gamma" when reading a Γ, whereas the upper case is not significant when reading ordinary text. (Similarly, if French phrases occur within an English document, these phrases should be pronounced according to French pronunciation rules.)

Pronunciation is modeled as a separate component of the audio formatter. The corresponding state space is discrete, with points representing different pronunciation modes. The space provides methods on the AFL local and global assignment statements. AFL programs can set the pronunciation mode locally within a block.

Suppose a document describing the career of the French mathematician Galois is being read. The introduction might read:

"The works of Galois were, as we know, published in 1846 by Liouville, in the Journal de Mathematiques. It is unfortunate that we do not have the works of the great geometer as an isolated body; thus the Societe Mathematique decided to reprint Galois' papers."

Reading the above using English pronunciation rules may result in poor audio formatting. Given that the French phrases are clearly marked up as in:

\french{Soci\'et\'e math\'ematique}a reading rule for the object french may be written as follows:

(defmethod read-aloud ((object french))

"Read aloud a french phrase."

(afl:new-block (afl:local-set-state French)

(read-aloud (argument 1 object)))) This would result in the French phrases being pronounced correctly.

Reading rules and styles enable the generation of different audio views of the same object. Objects are rendered by the generic function read-aloud. Methods on this function are defined for each object type appearing in the document model. The body of a read-aloud method consists of AFL statements that specify audio events. For example, the read-aloud method for object type string is:

```
(defmethod read-aloud ((text-string ))
    "Read aloud a string."
    (afl:send-text text ))
```

The read-aloud method has been implemented in a complex manner to permit the writing of multiple sets of rendering rules for the same object. A default rendering rule has been defined for all objects. A user may define additional rendering rules for an object. He or she may the select a preferred rendering rule set which remains in use until another rule set is subsequently selected. Unless otherwise specified, the default rule set is used. Having just one collection of read-aloud methods would allow the system to produce only one view of a document. To provide different views of the same object, the concept of reading rules and styles is required. To render an object, function read-aloud invokes a specific reading rule for that object. The body of the rule consists of AFL statements that modify formatter state and specify audio events. A typical reading rule is:
(def-reading-rule (<object-name> <rule-name>) <afl actions>)

Reading rules are object-specific. Named reading rules allow multiple rules for the same object. The read-aloud method on a particular object type invokes the currently active rule. At any given time, only one active rule is present for each object type. Rules can be activated interactively by executing:

(activate-rule <object-name> <rule-name>)

Each rule presents a different audio view of the object. The system provides a collection of default reading rules that are used when no rule has been explicitly activated for a particular object type.

Within the body of a reading rule, method read-aloud is invoked to read sub-objects. If a listener activates a new reading rule for fractions, then a summation that contains a fraction as the summand is rendered correctly. The summation is rendered as before, but the fraction in the summand is rendered using the newly activated rule.

Reading rules provide a convenient mechanism for switching between different ways of reading the same object. However, this is cumbersome when switching to a completely different rendering style, and a different rule for each object type needs to be then explicitly activated. For example, reading style $Style^{-1}$ is the collection of reading rules named $style^{-1}$. Activating a style makes all rules in that style active. To add $style^{-1}$ to the front of the list of active styles, the user may execute:

(activate-style <$style^{-1}$>)

The effect of this statement can be undone by executing:

(deactivate-style <$style^{-1}$>)

A reading style need not provide reading rules for all of the objects known to the system. A listener may create a new reading style by simply defining reading rules for a few objects.

The reading rules for the remaining objects are inherited from other styles. Thus, with the simple reading style as the most recently activated style, the user might define reading rules in the descriptive style for summations, integrals and co-products. The system uses reading rules from the simple reading style for all other objects, if style descriptive is currently activated. In the present system, the list of active styles is:

```
(variable-substitution
    use-special-patterns
    descriptive
    simple
    default)
```

Let O be an arbitrary object type. If no special rule has been explicitly activated for O, then the active rule for O is provided by the style occurring first from the front of the list that defines a reading rule for 0 or one of its superclasses. Thus in the above example, if the list of active styles is descriptive, simple and default, the active rule for an integral is descriptive. If the user, using this list of active styles, now wants to have all objects read but would like integrals read using the simple rule, then he or she would execute:

(activate-rule 'integral 'simple)

This system of reading rules and styles has proven very useful in experimenting with different ways of reading mathematics. The ability to obtain different views of an object is a very useful learning aid, as it gives the listener a chance to obtain different perspectives of complex expressions. Reading rules may also be used in other interesting ways (e.g., to selectively read parts of a document). As another example, defining and activating the following rule for paragraphs provides a thumbnail view of a document:

(def-reading-rule (paragraph quiet) nil)

The body of this rule is empty, and so the contents of paragraphs are not read. With this rule active, only the titles of the various sectional units are heard.

Document structure is implicitly conveyed in the audio renderings by producing audio layout made up of extra-textual speech and non-speech audio cues (analogical markings). Audio cues may be characterized as being either fleeting or persistent. Note that this classification is orthogonal to the earlier classification of cues divided into speech and non-speech audio cues. Cues are labeled either fleeting or persistent. A fleeting cue is a cue that does not last. Its duration is specified by the nature of the cue itself and is so characterized. A persistent cue is a cue that lasts. The duration for such cues is specified by other ongoing events in the audio rendering, rather than by the cue itself. Some examples of fleeting cues are:

Speech: Announcing "title" before reading the title; note that all fleeting speech cues are verbalized using a slightly softer voice to set them apart from actual document content Non-speech: Playing a short sound to indicate a bullet when reading itemized lists The method of the present invention minimizes the use of extra-textual announcements by cuing document structure implicitly, wherever possible. Specific fleeting sound cues are associated with objects such as paragraphs and bulleted lists to efficiently convey structure.

Fleeting cues are typically used to introduce particular objects. When rendering complex structure, however, more than an introductory cue is needed. For example, a fleeting cue at the beginning of each item is not insufficient when reading an itemized list; the listener is likely to forget that he or she is currently listening to a list, if the contents themselves are complex structures. In the visual setting, the logical structure of a list is displayed by superimposing implicit layout cues (such as indentation) on the text. To achieve a similar effect in the audio renderings, the system uses persistent cues. Persistent audio cues take the form of either a change in a characteristic of the reading voice or a repeating sound in the background. Persistent cues have the advantage of being present during the entire reading without detracting from the flow of information. Some examples of persistent cues are:

Speech: Raising the pitch of the voice when reading the contents of an itemized list Non-speech: Playing a continuously repeating sound while reading an abstract Audio layout is achieved by superimposing fleeting and persistent cues on the audio rendering. In order to convey nesting effectively, the kind of variations used need to be monotonic in the mathematical sense. Let P represent a point in the audio space. Let f be a change of state function. Then, in order to convey nesting, f should be monotonic where this ordering is perceptible to the listener (i.e., there exists an ordering):

$$\{P<f(P)<f^2(P)<\ldots\},$$

This is where the abstraction of a speech space is leveraged by the operators it provides. For example, the following AFL statement defines a function that generates new reading states when reading itemized lists:

```
(afl:step-by afl:*current-speech-state* ;
    'afl:average-pitch 1)
```

This notion of monotonicity in change of AFL states will also be exploited when designing an audio notation for mathematics.

Structures such as lists and centered text are marked up in TeX® as special environments. These are characterized by special visual layout that is used to display the structure. Thus, a list of items is cued by indenting the items in the list. Nested lists are displayed by indenting them with respect to the outer list. The method of the present invention achieves this same effect of nesting in audio by leveraging the abstraction of a speech space and the operators it provides.

An itemized list is represented internally as an object of type itemized-list with the list of items as its children. Here, each item itself can be a complex text object. The AFL rule for rendering object itemized-list is:

```
(def-reading-rule (itemized-list default)
    (afl:new-block
        (afl:local-set-state
            (afl:step-by afl:*current-speech-state* ;
                'afl:average-pitch 1))
        (loop for child in children do
            (read-aloud child))))
```

The above reading rule first begins a block, locally sets the state of the audio formatter by raising the pitch of the reading voice, and then renders the contents of the itemized list. The contents are thus rendered relative to the containing list. When applied to a nested list, the inner list is rendered relative to the outer list. The pitch increases by one step when reading the outer list, and increases by another step when within the inner list. Thus, the local scope introduced by the AFL block permits writing a simple reading rule that works effectively in conveying nested structures.

The method of the present invention uses stereo effects when reading tables. Printed tables exploit the two-dimensional nature of the visual tablet in conveying the relation between the table entries. Merely speaking the contents of a table does not convey this information. Saying "next column" and "next row" before reading each new row or column may be too distracting. Exploiting spacial audio techniques produces an audio layout that allows the listener to correctly understand the position of each entry in a table. The reading rule varies the current AFL state along a line in the speech space spanned by the dimensions corresponding to the left and right volumes. The number of columns to be read determines the increment by which to move in the audio space.

With reading progressively moving to the right, this results in the first element of each row read on the left speaker and the last element read on the right. The reading rule to accomplish this spatial placement is:

```
(def-reading-rule (tabular simple)
    "Simple reading rule for arrays, uses directional
                                        audio"
    (afl:new-block
        (afl:local-set-state
            (afl:multi-move-to afl:*current-speech-state*
                                        '(afl:left-volume 100)
                                        '(afl:right-volume 0)))
    (let ((contents (contents tabular))
            (left-offset nil)
            (right-offset nil))
        (loop for row in contents do
        ; First compute the step-size
        ;based on length of the row
                            (setf left-offset ... )
                            (setf right-offset ... )
                            (afl:new-block
                                (read-aloud (first row))
                                (loop for column in (rest row) do
                                    (afl:local-set-state
                                        (afl:multi-move-by
                                            'afl:*current-speech-state*
                                            '(afl:left-volume ,left-offset)
                                            '(afl:right-volume
                                            ',right-offset )))
                                    (when column
                                        (afl:new-block
                                            (read-aloud column)))))) ;done reading row
    )))
```

The method of the present invention characterizes each written mathematical notation as being one of two categories. First, there is notation which projects the inherent tree structure of mathematical expressions onto a two-dimensional display. This is accomplished through the use of different types of delimiters or by stacking objects one above another in various arrangements. The second category of notation annotates this tree structure with visual attributes. Six such visual attributes have been identified. Different aspects of the two-dimensional display are used to produce such visual attributes (e.g., changes in baseline, changes in font size, etc.).

The visual cues used to project the inherent tree structure are independent of the cues used to produce the visual attributes. Hence, the visual attributes may themselves contain arbitrarily complex tree structures. An equivalent audio notation that is used to present concisely spoken mathematics has been developed. The first step is to identify dimensions in the audio space that will be used to parallel the functionality of the dimensions in the equivalent visual setting. This system of audio notation is then augmented by the use of pauses, prosodic cues (such as voice inflection), descriptive phrases and sound cues.

The method of the present invention minimizes the verbiage used in math readings. Concise readings serve to efficiently convey the concepts, leaving the listener time to reason about the expression. More descriptive readings can be used when one is listening to unfamiliar material. Thus, it is possible to have a wide range of readings of a math expression, for instance. A reading may vary between being fully descriptive and completely notational. Choices of how much to rely on the audio notation, and how descriptive readings should be, are entirely subjective. The listener can interactively determine the kind of readings the system produces, choosing the style that he or she finds most appropriate.

Visual notation linearizes the tree structure corresponding to mathematical expressions, allowing the reader to browse the underlying structure. This is achieved by using different types of visual delimiters such as (, [, [, |, <, _, _, ... These visual delimiters help the author mark off "interesting" subtrees within a complex expression. In addition, visual attributes (such as superscripts, subscripts, accents and underbars) help in conveying information concisely. In contrast, a plainspoken description of a mathematical expression is completely linear. Much of the expressive power is lost. Spoken renderings of complex mathematics, as currently found in talking books, compensate for this loss of expressive power by using extra textual phrases, thereby making the readings verbose. In contrast, the method of the present invention uses fleeting and persistent cues to especially exploit the computer's ability to vary the characteristics of a synthetic voice. The readings produced are, therefore, much more concise.

The abstraction of the audio space is also leveraged to define unique audio dimensions that make up the various pieces of the audio notation. These audio dimensions may be thought of as lines determined by a combination of the speech and non-speech dimensions hereinbefore described. (These lines are usually curves, not straight lines.) The AFL states used to produce different pieces of the audio notation are reached by "moving" along these audio dimensions. As previously described, the functions used to generate new states are monotonic in the mathematical sense.

The quasi-prefix form previously described captures all of the information present in the visual notation. To produce an equivalent audio notation, unique audio dimensions that are used to cue different aspects of this structure are defined. The quasi-prefix representation is a tree with attributes. Pick one audio dimension, denoted dim-children, along which to vary the current AFL state as different levels of a tree are rendered. In addition, pick dimensions orthogonal to dim-children to cue the visual attributes as follows. Let x and y denote two speech space dimensions. Now three lines in the speech space are picked, x=0, x+y=0, and x−y=0. Conventional mathematical notation has built up a strong association between the superscript and subscript. A reader intuitively thinks of them as opposites. The superscript moves up, and the subscript moves down. This association is also leveraged by moving the AFL state "forward" along a specific audio dimension before reading superscripts and "backward" along this same dimension for subscripts. Thus, the system uses states along the line x−y=0 to cue left superscripts and subscripts, x=0 to cue accents and under bars, and x+y=0 to cue superscripts and subscripts. The system ensures that these dimensions remain independent of dimension dim-children by using x and y that do not appear in dim-children. In the embodiment chosen for purposes of disclosure, x=head-size and y=average-pitch.

The audio dimensions that are currently implemented are now described. One implemented dimension is the effect of moving along an audio dimension to produce a softer, more animated voice. In this dimension, the change in voice characteristic produces a sense of falling off into the distance as successively deeper levels of nesting are rendered.

Rendering superscripts effectively is accomplished by moving along another audio dimension which produces a higher-pitched voice. An accompanying change in the head size keeps the voice from sounding unpleasant. The step size along both the average-pitch and head-size dimensions is reduced. This allows for unambiguous rendering of superscripts within superscripts.

Shown below are the audio dimensions implemented for reading sub-trees, subscripts and superscripts.

For reading sub-trees:

(afl:multi-step-by state
    '(aflsmoothness 2) '(afl:richness −1) ;softer
    '(afl:loudness 2) '(afl:quickness 1) ;animated
    '(afl:hat-rise 2) '(afl:stress-rise 2)) ;animated For reading superscripts:

(afl:generalized-alf-operator state
    '(afl:step-by afl:average-pitch 1.5)
    '(afl:step-by afl:head-size −.5)
    '(afl:scale-by afl:average-pitch .5 :slot
      'afl:step-size)
    '(afl:scale-by afl:head-size .5 :slot
      'afl:step-size))

Figure 6:
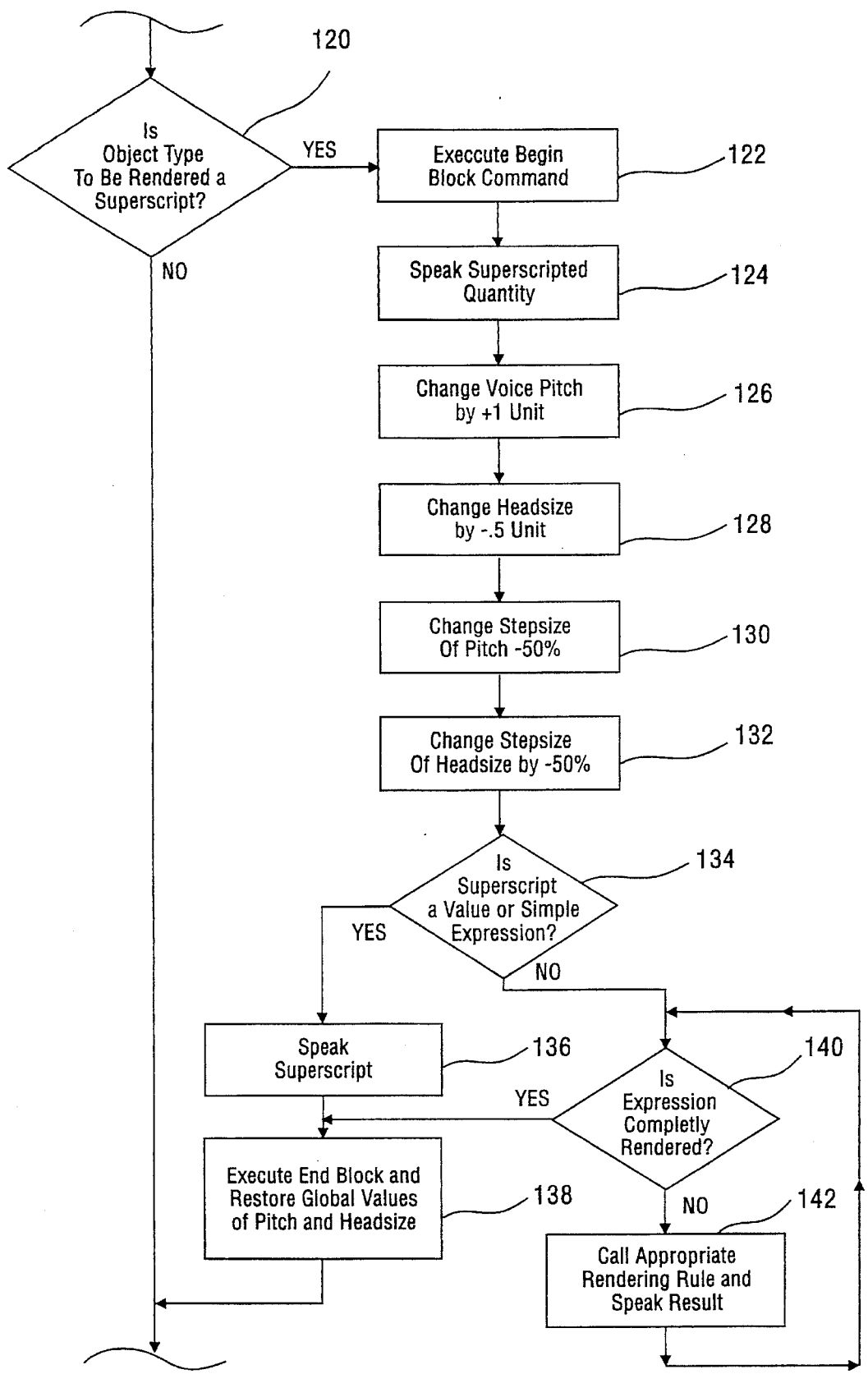
FIG. 6 is a flow chart of the audio rendering rule for superscripts in accordance with the method of the invention, illustrated in FIG. 1.

Referring now to FIG. 6, there is shown a flow chart illustrating the steps required to render a superscript. If the object to be rendered is a superscript, step 120, the necessary subsequent steps for rendering the superscript are performed. First, an AFL begin-block statement is issued, step 122. The superscripted quantity is then spoken, step 124, according to the current audio state. Next, voice pitch is raised, step 126, and the headsize is reduced by one-half unit, step 128. The step size of both pitch and headsize are then reduced to 50% of their current values, steps 130 and 132, respectively. If the superscript to be rendered is a value or simple mathematical expression, a decision is made, step 134. When the decision is "yes", the superscript is spoken, step 136. An AFL:end block statement is then issued, step 138. Audio state is returned to the global state that existed before the issuance of the AFL:start-block, step 122. Control is then passed to the main routine of the program.

If the decision is "no" step 134 the superscripted quantity is not a value or a simple mathematical expression, the appropriate rendering rules are called, step 142, recursively, if necessary. This continues until the superscripting expression (all nodes of the structure tree) has been processed, decision block 140. If the decision is "yes", step 140, then block 138 is entered and an AFL:end-block statement is issued. Audio state is returned to the global state that existed before the issuance of the AFL:begin-block statement, step 122. Control is then passed to the main routine of the program. If the decision is "no" decision block 140, the appropriate rendering is called (block 142) and decision block 140 is re-entered.

For reading subscripts:

(afl:generalized-afl-operator state
    '(afl:step-by afl:average-pitch −1.5)
    '(afl:step-by afl:head-size 1)
    '(afl:scale-by afl:average-pitch .5 :slot
        'afl:step-size)
    '(afl:scale-by afl:head-size .5 :slot
        'afl:step-size The technique used by written notation to cue the inherent tree structure present in mathematical notation is insufficient for audio renderings. Using a wide variety of delimiters (such as the parenthesis) to write mathematics works, because the eye is able to traverse the written formulae quickly and pair off matching delimiters. The situation is slightly different in an audio rendition. When listening to an expression, merely announcing the delimiters as they appear is not enough. A listener must remember enclosing delimiters even when listening to a possible complex sub-expression appearing inside of a set of delimiters. Previous embodiments of an audio formatter used for mathematical expressions employed sound cues to "display" mathematical delimiters as fleeting sound cues. The nesting level was conveyed by increasing the pitch of the sound used to cue delimiters, but deeply nested expressions became increasingly difficult to understand.

The system of the preferred embodiment enables a listener to keep track of the nesting level by using a persistent speech cue, achieved by moving along dim-children, when reading the contents of a delimited expression. This, combined with fleeting cues for signaling the enclosing delimiters, permits a listener to comprehend deeply nested expressions. This is because the "nesting level information" is implicitly cued by the readings in the form of the currently active voice; it is present throughout the reading of the parenthesized expression.

Mathematical expressions are read as infix or prefix, depending on the operator appearing at the root. All of the large operators such as $f$ and $\Sigma$ are read as prefix, in addition to the mathematical functions like sine. All other expressions are read as infix. A persistent speech cue indicates the current level of the tree being rendered. The current AFL state is varied along audio dimension dim-children before reading the children of an operator. The number of new states may be minimized by analyzing the complexity of math objects and the precedence of mathematical operators to determine whether a new state is required. Thus, new AFL states are used when reading the numerator and denominator $$\frac{a+b}{c+d}.$$

No new AFL state is introduced when reading $$\frac{a}{b}+c+d.$$

Similarly, when reading sin x, no new AFL state is used to read x. When reading sin(x+y), however, a new AFL state is used to read the argument to sin.

In the context of reading sub-expressions, introducing new AFL states can be thought of as parenthesizing in the visual context. In light of this statement, the above assertion about minimizing AFL states can be thought of as being analogous to avoiding the use of unnecessary parentheses in the visual context. Thus, a+bc+d is written, rather than a+(bc)+d. Parentheses are used, however, to write (a+b)(c+d). Analogously, it is not necessary to introduce a new reading state for reading the fraction when rendering $$a+\frac{b}{c}+d,$$

whereas a new reading state is introduced to read the numerator and denominator of $$\frac{a+b}{c+c}.$$

Another example illustrates the benefits of an "audio notation" in rendering unusual mathematical notation. In the following, $+_n$ denotes addition modulo n. Given this information, $$x+_nY+_nZ$$

may be read as "x plus mod n y plus mod n z". However, if this information is unavailable, the system can still produce a reading that can be correctly interpreted by a listener who is aware of the fact that the + sign can be subscripted. Further, the listener who is familiar with $+^n$ denoting modulo arithmetic can now understand the expression.

When reading superscripts and subscripts, new AFL states are entered only if necessary. Typically, "x1" in traditional, spoken math means $x^1$. Reading style "descriptive" takes advantage of this convention to avoid using new AFL states when reading simple subscripts.

The audio dimensions are supplemented by using silence around sub-expressions to indicate grouping. The amount of silence to be used is computed and based on the "weight" of a sub-expression. If the "weight" of an object is 1, then no pause is inserted; otherwise, the weight of the object is scaled by a constant factor, *pause-around-child*, to give the number of milliseconds of pause to be inserted around the reading.

Using inserted pauses, the system reads $$a+\frac{b}{c}+d$$

unambiguously because there is a pause around the fraction. No pause is inserted in reading the simple expression a, when it occurs by itself. Inserting a pause after a is unnecessary and would, in fact, create an adverse stuttering effect in the outputted speech.

As hereinbefore described, no semantic interpretation is attached to mathematical content at the recognition step. The recognizer can be enhanced to identify specialized notation and have $x^2$ read as "x squared". To enable this, the system processes the quasi-prefix form returned by the recognizer before rendering them. The kind of information that is captured in this step is now described.

1. Weight of an object: Computes a measure of the complexity of a sub-expression
2. Special patterns: Recognizing math sub-expressions that satisfy special patterns Measure "weight" quantifies the complexity of math expressions. The weight function is defined as follows:

1. The weight of simple leaf nodes is 1. Nodes corresponding to variables occurring in math expressions are called leaf nodes. A simple leaf node is a leaf node that has no visual attributes.
2. The weight of leaf nodes with attributes is 1+weight-of-attributes.
3. The weight function on non-leaf nodes is defined recursively:

weight(m)=w-co+w-ch
   w-co=weight(contents(m))
   w-ch=weight (children(m))

Recognizing special patterns makes readings sound more natural. Consider a human, reading a math expression. Even though a human might read $$\frac{a+b}{c}$$

as "the fraction a plus b divided by c", he or she might read a/2 as "one half of a". In addition, mathematical notation is inherently ambiguous, with the same notational construct being overloaded to mean different things in different contexts. Thus, the −1 appearing in the exponent in the expression $x^{-1}$ has a different meaning from the −1 appearing in $\sin^{-1}x$. The recognizer treats both occurrences of the −1 as a visual attribute on the preceding object. The decision to treat the −1 appearing as a superscript to the function as denoting the function inverse is made by reading rules that specialize based on special patterns.

Because such interpretation is context-sensitive, the quasi-prefix representation is first enhanced by identifying special patterns. Before an object is read, "special-pattern", a memoized method for class math-object is called to identify any special patterns. A function is said to be memoized if it "remembers" previous calls to that function. Memoization makes functions more efficient and avoids complicated computation. A user may specify additional patterns by using this generic function to provide method definitions for function "special-pattern" for specific object classes. These special patterns can then be turned on by calling (turn-on-special-pattern <class-name>). The user can provide reading rules named <pattern-name> for class <class-name> which get invoked when the particular special pattern is seen. Special patterns can be turned off individually by calling (turn-off-special-pattern<class-name>). All special patterns can be turned off simply by deactivating the style "use-special-patterns".

Special patterns built into the preferred embodiment of the system include:

A "2" appearing in the superscript of expression is interpreted as squaring, a "3" as cubing, etc.

T appearing in the superscript of a valid matrix expression denotes a transpose.

−1 appearing in the superscript of a function name denotes the function inverse.

$D_x^n$ denotes a derivative.

Some descriptive AFL reading rules show how additional rules may be written for existing objects to produce customized audio renderings.

The first rule applies to reading integrals. The various parts of an integral have special meaning. Using the audio notation produces a reading that cues the subscript and superscript on the integral, leaving it to the listener to interprets the overall meaning. The descriptive readings interprets the various visual attributes appearing on the integral operator. The readings produced then sound more natural. The integral rule interprets the subscript and superscript as the limits of integration. Integrals having no superscript are interpreted as surface integrals. The rule also correctly identifies the variable of integration in the majority of examples. The integral reading rule is:

```
(def-reading-rule (integral descriptive)
    "Descriptive reading rule for integrals"
    (let
        ((lower-limit (subscript integral ))
         (upper-limit (superscript integral ))
         (children (children integral))
         (pause-amount (compute-pause integral ))
         (variable-of-integration    (variable-of-integration
                                         integral)))
    (afl:with-surrounding-pause pause-amount
       (read-aloud " Integral ")
       (cond
          ((and lower-limit upper-limit)
           (read-aloud "from ")
           (when variable-of-integration
              (read-aloud (children variable-of-integration))
              (read-aloud " equals" ))
           (read-aloud lower-limit)
           (afl:pause 1)
           (read-aloud " to ")
           (read-aloud upper-limit)
           (afl:pause 1))
          (lower-limit
           (when variable-of-integration
              (read-aloud " with respect to ")
              (read-aloud (children variable-of-integration )))
           (read-aloud " over, ")
           (read-aloud lower-limit ))
          (variable-of-integration
           (read-aloud "with respect to ")
           (read-aloud (children variable-of-integration ))))
       (afl:force-speech)
       (read-aloud (first children))
       (afl:force-speech)
       (read-aloud variable-of-integration)
       (afl:subclause-boundary))))
```

Rendering rules produce a particular "display" of a given structured object. Thus, in a system such as TeX®, the author of a macro picks a specific layout for objects appearing in the document. This choice, once made, usually remains consistent throughout the rendering of the document. On an interactive system such as the method of the present invention, this need not be true. The listener may be allowed to select different ways of "hearing" the same object.

In another example, the following reading rules show different ways of reading occurrences of the substitution (subst) operator. These different reading rules allow the listener to "look" at a particular expression from different perspectives. R[S/T] denotes R with T replaced by S. The linear "display" used to lay out this expression on paper is only one possible linearization of the substitution object. Several different ways of viewing this object are possible, such as a ternary operator. When speaking this expression, the description can be formulated in several ways, as shown in the reading rules below.

R[S/T] is written using the macro subst, a macro defined to take three arguments. The recognizer is first extended to recognize this macro call into object \subst having three arguments as follows:

```
(define-text-object :macro-name "subst"
    :number-args 3 :processing-function subst-expand
    :precedence mathematical-function :object-name subst
    :supers (math))
```

Instances of subst occurring in the document are now recognized into instances of object subst. Object subst has three argument slots, which are each allocated to the result of processing the arguments to the subst call.

The following AFL rules generate different readings of this object. First, English descriptions. The next two reading rules use plain English to produce a descriptive reading. They are good reading rules to use when the concept of substitution is being introduced. However, these rules do not work well for more complex examples, such as R[X/Y][S/T].

```
;;; using a new afl state inside a descriptive reading
                        sounds awful
(def-reading-rule (subst english-active)
    " english-active reading rule for object subst"
    (let (
          (pause-amount (compute-pause subst)))
         (afl:with-surrounding-pause pause-amount
            (read-aloud (argument subst 1 ))
            (read-aloud " with ")
            (read-aloud (argument subst 2))
            (read-aloud " for ")
            (read-aloud (argument subst 3 )))))
(def-reading-rule (subst english-passive)
    " english-passive reading rule for object
                                          subst"
    (let(
         (pause-amount (compute-pause subst)))
        (afl:with-surrounding-pause
              (*pause-amount*pause-around-child*)
           (read-aloud (argument subst 1))
           (read-aloud " with ")
           (read-aloud (argument subst 3))
           (read-aloud "replaced by ")
           (read-aloud (argument subst 2 )))))
```

Now, the AFL rules for a linear reading of the same object are given. The following linear reading mimics the visual notation. It is succinct, since it avoids the use of words such as "brackets", relying instead on voice changes to convey the nesting. It is a good alternative to the tree-like reading.

```
(def-reading-rule (subst linear)
    " linear reading rule for object subst"
    (read-aloud (argument subst 1))
    (afl:new-block
      (afl:local-set-state
        (afl:multi-step-by afl:*current-speech-state*
                     '(aflsmoothness 2) ;softer
                     '(afl:richness −1) ;softer
                     '(afl:loudness 2) ;don't disappear
                     '(afl:quickness 1) ;animated
                     '(afl:hat-rise 2) ;animated
                     '(afl:stress-rise 2)))
       (read-aloud (argument subst 2))
       (read-aloud " slash " )
       (read-aloud (argument subst 3))))
```

Finally, there is shown a reading rule that renders a tree-like reading of object subst. This is a very good reading rule for rendering complex subst objects, once the listener is familiar with the concept of substitution. This rule has the advantage of being very succinct, and conveys nesting effectively.

```
;;; A new AFL state is used to read the children of a
;;; tree. The function used to generate the new state
;;; is monotonic in the mathematical sense
(def-reading-rule (subst tree-like)
    " tree-like reading rule for object subst"
    (read-aloud "substitution ")
    (afl:new-block
       (afl:local-set-state
         (afl:multi-step-by afl:*current-speech-state*
                      '(aflsmoothness 2) ;softer
                      '(afl:richness −1) ;softer
                      '(afl:loudness 2) ;don't disappear
                      '(afl:quickness 1) ;animated
                      '(afl:hat-rise 2) ;animated
```

-continued

```
                      '(afl:stress-rise 2))) ;animated
      (read-aloud (argument subst 1))
      (read-aloud (argument subst 2))
      (read-aloud (argument subst 3))))
```

The use of AFL in writing audio rendering rules for complex structures has now been shown. The audio renderings produced by such rules do convey structure. However, oral communication takes more time than written communication. This means that the listener must retain a great deal more information than a person perusing printed text. This disadvantage is perceived most when listening to complex mathematics. Complicated expressions take time to articulate. Sometimes the listener forgets the beginning of an expression by the time he or she comes to its end. Experienced readers of mathematical formulae appear to first look at the top-level structure of complex equations and then progressively read the sub-expressions. Thus, consider the Faa De Bruno's formula:

$$D_x^n w = \sum_{0 \le j \le n} \sum_{\substack{k_1+k_2+\ldots+k_n=j \\ k_1+2k_2+\ldots+nk_n=n \\ k_1,k_2,\ldots k_n \ge 0}} D_u^j w \frac{n!(D_x^1 u)^{k_1} \ldots (D_x^n u)^{k_n}}{k_1!(1!)^{k_1} \ldots k_n!(n!)^{k_n}}$$

It is first seen as an equation with a derivative on the left-hand side and a double summation on the right-hand side. A reader then sees that the inner summation has a complicated constraint and that the summand is a fraction. Finally, he or she will read the entire expression.

The steps enumerated above are carried out implicitly by the eye, making it difficult to identify the atomic actions involved. Yet, it is clear that readers rely on this type of breaking up or "chunking" of complex expressions in order to understand them. In fact, most of visual mathematical notation is an attempt to aid this process of grouping sub-expressions together in a meaningful manner. Even in the visual domain, writing out Faa De Bruno's formula in a fully linearized manner, e.g., the TeX® encoding, makes comprehension of the formula difficult, if not impossible.

In the audio setting, the listener does not have the luxury of being able to view both the top-level structure, as well as the leaves of the formula when listening to a straight reading of the expression. This means that the system must take over part of the work that was described as being implicit in the visual context. In this case, the system must recognize the same kind of grouping that the experienced reader perceives in the visual notation. Once such grouping has been recognized, the system can then synthesize readings that convey this top-level structure to the listener.

This process is called reading with "variable substitution" in the method of the present invention. Thus, given a complex expression of the form $\rule{1em}{0.1pt}$, the system recognizes this top-level structure to produce the reading, "Fraction x over y, where x is . . . , and y is . . . ". Variable substitution is implemented as an additional reading style. The listener can activate this style and have the system perform variable substitution where appropriate. Applying variable substitution to Faa De Bruno's formula stated hereinabove yields:

$$D_x^n w = \sum_{0 \leq j \leq n} \sum_{\substack{k_1+k_2+\ldots+k_n=j \\ k_1+2k_2+\ldots+nk_n=n \\ k_1,k_2,\ldots k_n \geq 0}} D_u^j w \underbrace{\frac{n!(D_x^1 u)^{k_1} \ldots (D_x^n u)^{k_n}}{k_1!(1!)^{k_1} \ldots k_n!(n!)^{k_n}}}_{\text{denominator 1}}$$

$$\underbrace{\phantom{xxxxxxxxxxxxxxxxxxxxxxxxx}}_{\text{lower constraint 1}}$$

$$I = \int_0^\infty e^{-x^2} dx$$

which would be read as "i=integral with respect to x from 0 to infinity of f dx, where f is . . . "

Adherence to the following principles has been found useful to effectively employ variable substitution. First, minimize the number of levels of substitution. Ideally, there should be no more than one. Second, avoid unnecessary substitutions. Third, use a complexity measure that determines when an expression is sufficiently complex to warrant variable substitution. This measure should capture the following properties of an expression:

a) Complexity of a math object considered by itself b) Relative complexity of an expression with respect to its parent Under the first requirement, any variable substitution scheme applied should result in a simple top-level expression. The second requirement ensures that the top-level expression conveys as much information as possible. In addition, it ensures that the readings resulting from variable substitution do not end up being more complicated than the plain readings.

The algorithm used for producing variable substitutions uses two user-specified complexity thresholds, the purpose of which will become clear in the following description. The algorithm computes substitutions recursively. Given an expression e, the algorithm first computes the expression's weight, w. If w <*absolute-complexity-threshold*, then no substitution is performed. Otherwise, e is a good candidate for variable substitution.

The algorithm first tries to substitute for the children of e. Given children $c_i$ (1≤i≤n), compute their weights $w_i$. Substitution is made for a child $c_i$ if and only if its relative complexity is greater than *proportional-complexity-threshold*. Thus, for each $c_i$, if $w_i \geq w$ ⁅ *proportional-complexity-threshold*, the algorithm is applied recursively to $c_i$. If no substitution can be performed on the children of $c_i$, substitute for $c_i$. If no substitution can be performed on any of the $c_i$ or their sub-expressions, then substitute for e, provided that e is not a top-level expression. Do not substitute if e is one of the sides of a relational expression.

A simplified version of the function which implements this algorithm is shown below.

```
(defun collect-substitutions (math-object
                              &optional (threshold 1))
  '' Substitute for math-object.
   Threshold gives the current complexity threshold"
  (let ((substitutions nil))
    (cond
      ((< (weight math-object) threshold)
       substitutions )                    ;nothing to do
      ((every #'(lambda(x)
                  (<= (weight x) threshold))
              (children math-object ))    ;all children are
                                          ;simple
```

```
        <substitute for math-object>)
       (t
        (push
          (loop for child in (children math-object)
                                          ; substitute child
                when (> (weight child) threshold) collect
                  (collect-substitutions child threshold))
          substitutions )))))
```

Given a top-level expression e having weight w, the function may be called as follows:
(collect-substitutions e (complexity-threshold e))
where (complexity-threshold e) is defined as:
(defun complexity-threshold (object)
  "Compute the threshold value for this object"
  (let ((proportional
          (+ 1 (truncate
                  (* (weight object )
*proportional-complexity-threshold* )))))
    (max proportional *absolute-complexity-threshold*)))

Note that instead of computing $w_i/w < $*proportional-complexity-threshold*, the algorithm is initialized with the threshold w⁅*proportional-complexity-threshold*, because w remains constant throughout the algorithm.

Empirical values for the three constants used in the algorithm were determined as follows:

*absolute-complexity-threshold*=8

*proportional-complexity-threshold*=1/7 attribute-complexity-threshold*=2.5

An expression occurring as the first child of a fraction is called its "numerator". This is called contextual information. Thus, the left-hand side of an implication is called the "premise" and its right-hand side the "conclusion". This information has been built in for standard mathematical objects and provides a flexible mechanism for the user to add or modify such information.

A description of the browser feature of the present invention's method now follow.

When perusing a printed document, a reader can quickly skip between portions thereof, reading only those sections that are of individual interest. Typeset documents allow such structured browsing by using layout cues to reveal the underlying document structure; the eye's ability to "randomly access" portions of the two-dimensional printed page takes over.

An audio document is somewhat different. The information in a printed document is passive, and is accessed by an active reader capable of selectively perusing the text. This passive/active relationship is reversed in traditional oral communication; the information flows by a passive listener who has little control on what he or she hears. This predicament may be particularly serious when structured documents are presented in audio—a listener is likely to lose interest by the time the relevant information is presented. A facility to enable a listener to become "active" (i.e., enable the listener to determine what he or she hears) in this process is required.

The first step in achieving this is to make audio documents fully interactive. Techniques for changing how particular objects are rendered in audio have already been described. A browser for audio documents allows users to interactively traverse the internal high-level representation of such documents and listen to selected portions of interest. The browser provides basic tree-traversal commands that allow such interactive movement. These commands may be composed by a user to effectively browse the underlying structure of a particular document.

The design of the inventive method's browser was motivated by the conjecture that most visual browsing actions are, in fact, guided by an underlying structure present within the information, although they appear to be a consequence of the eye's randomly accessing portions of a two-dimensional display. Thus, when reading a complex mathematical expression that involves a fraction, a user listener may quickly look at the numerator while reading the denominator. This single act of checking the numerator can be decomposed into a series of atomic tree traversal movements with respect to the structure of the expression. In the visual context, these actions happen rapidly, leading to the feeling that the eye can almost randomly access relevant portions of the visual display. This notion of randomness disappears, however, when such visual browsing becomes difficult in a poorly-formatted document where the underlying structure is not apparent. Similarly, even when presented with a well-formatted document, a person unfamiliar with the subject matter at hand finds it very difficult to perform the same kind of visual browsing that he performs with familiar subject matter. Visual browsing thus depends upon familiarity with the underlying structure, as well as a clearly displayed rendering thereof. In the audio document browsing facility of this method this functionality is parallelled by building up a rich internal representation of the document and providing a set of atomic actions to traverse this representation. How well a user can browse this representation is now a function of the user's familiarity with the subject matter being presented.

Now described is the method whereby a user may quickly scan (traverse the high-level representation) an audio document. The high-level representation for a document structure is an attributed tree. Tree structures are particularly easy to traverse, and this mechanism provides a uniform way of traversing document structure that is present in both plain text and mathematical formulae. All browsing actions are defined with respect to the current selection, a node in the internal tree representation of the document, and recorded in variable *read-pointer*. Typically, the current selection is initially set at the root of the document. It may be moved in two ways: first, by interrupting the reading of the current selection ND executing the stop command bound to s (commands stop and quit are described in detail hereinafter); secondly, by moving the selection when no reading is in progress. This usually involves single keystrokes to execute a command.

Commands which may be so executed are now described. Key-mapping for these commands is principally inspired by the key-map used by the UNIX VI editor.

```
t       move to the top of the document
C-u t   move to the top of the current math expression
h:      move left: sets current selection to previous sibling, if any
l:      move right: sets current selection to next sibling, if any
j:      move down: sets current selection to first child, if any
k:      move up: sets current selection to parent, if defined
```

The above set of actions is augmented to enable the traversal of an attributed tree structure. In that model, all nodes have content.

i:—move to content: sets current selection to the contents of the current selection The following actions move the selection to the various attributes. The parent of an attribute is defined as the object being attributed. The result of moving to attributes can, therefore, be undone by moving back up to the parent.

^:—move to superscript if any

_:—move to subscript if any

*:—move to accent

:—move to under bar

!:—move to left subscript

%:—move to left superscript

This key-map for traversing the attributes was arrived at as follows. The choice for superscript and subscript is almost automatic, since the keystrokes match the symbols used by TeX® to mark superscripts and subscripts. Placing the fingers on the row of numerals on a standard keyboard, the actions necessary for typing ^ and _ with the right hand are mimicked with the left hand to arrive at the keybindings for the left superscript and subscript. The middle finger of each hand is used for the accent/underbar.

The only objects in the internal representation that do not completely conform to the tree traversal model are tables. This is because each table element is linked to its parent, as well as its four neighbors. The left and right neighbors can be modeled as siblings, but extra links are needed and, hence, extra actions to traverse the entries by columns.

a:—move to element above d:—move to element below

When any of the above browsing actions is executed, the new selection is automatically cued. These cues are designed to be concise, but informative. A typical problem encountered when traversing complex structure is the so-called "lost in space" problem; a user gets disoriented with respect to his current selection. This problem is avoided by conveying the following bits of information after each move:

Context: Contextual information about where the current selection occurs, with respect to the rest of the document Type: The type of the current selection which typically involves summarizing the current selection (described hereinafter).

Thus, when moving down the right-hand side of Faà de Bruno's aforementioned formula, the listener would hear:

| Key-press | Action | Context | Type |
|---|---|---|---|
|  |  | Right hand side is | Summation |
| j | First child | Summand is | Summation |
| j | First child | Summand is | Juxtaposition |
| j | First child | First term is | Derivative |
| l | Next sibling | Second term is | Fraction |
| j | First child | Numerator is | Product |
| l | Next sibling | Denominator is | Product |

Messages such as these are sufficient in avoiding the lost-in-space problem.

The nature of an object is conveyed by summarizing it. Generic function "summarize" is called to summarize an object; methods on this function specify how individual object types are summarized. By providing interchangeable methods, a flexible mechanism for changing how different objects are summarized is created. Below is a partial list, showing how various object types are summarized. In cases where insufficient information is available to generate a complete summary of an object instance, the type of that object is spoken.

| Object Type | Summary |
|---|---|
| Article | Title |
| Sectional unit | Section Title |
| Complex Math object | Operator appearing at the root |
| Math object (leafnode) | Read node |

Contextual information specifying what the children of specific math objects are called is built into the system.

Children of an inference are called premise and conclusion; children of a fraction are called numerator and denominator. Such information was first used to advantage in generating meaningful names when applying variable substitution; this information is once again exploited to give contextual information about the current selection.

Traversing the structure of mathematical expressions is particularly useful when used in conjunction with the variable substitution reading style. In fact, such traversal can be thought of as a dual to using variable substitution. If an expression has been rendered once when using the variable substitution style, then future traversals of that expression use the variable names generated in the substitution process when cueing the current selection. This proves to be a very useful memory aid in understanding complex equations such as Faa de Bruno's formula.

Traversing document structure is also quite helpful when handling large documents, e.g., entire textbooks. The browser actions described so far enable the listener to quickly move through the document without having to listen to a lot of text. In conjunction with the ability to switch reading styles, this enables the quick location of particular portions of interest in a book. For instance, a listener can activate a reading rule so that only the mathematics appearing in a document is rendered. Once an equation of interest is encountered, the listener may interrupt the reading, move the current selection from that point to the enclosing paragraph or sectional unit (as so desired) and then listen to the particular portion of the document.

The current selection is typically read by executing the browser command "read-current bound" to the space-bar. The reading commenced by "read-current" can be interrupted in two ways:

Quit: Command quit is bound to the "q" key. It interrupts the current reading and leaves the current selection where it was when the reading was launched.

Stop: Command stop is bound to the "s". It stops the reading, and leaves the current selection at the object last read. Thus, executing read-current and then stop moves the current selection.

Another reading action is to read the rest of the document, beginning at the current selection. This is enabled by browser command "read-rest" bound to the "c" key.

Moving the selection to the next or previous nodes and then reading it is such a common sequence of actions that we provide commands that combine these actions. These commands are "read-previous" and "read-next" bound to the "p" and "n" keys respectively.

In addition, the browser provides command "read-just-this-node" bound to the "r" key. This command reads only the current node, rather than the entire sub-tree rooted at this node. This is useful when traversing complex mathematical expressions.

The current selection may be read either as if it occurs by itself, or as it would be if it were rendered along with the rest of the document. Reading the current selection as though it occurs by itself is simple. The system executes generic function "read-aloud" on the current selection. Reading an object as it would be rendered within the complete document presents an interesting problem. Asking that an object be rendered relative to its position in the entire document is analogous to selecting a word from the electronic encoding of a textbook and asking the question: On what page in the book does this word appear?

In general, answering such a question would involve a complete rendering of the book. Analogously, rendering the current selection relative to its position in the document can be computationally intensive. This complexity is avoided in the inventive method by recording a pointer to the AFL state current, when every document object is rendered. This appears to require a lot of storage. In reality, this approach is both feasible and efficient, because the same AFL states are used to render a large number of the objects appearing in a document. This means that the number of states that need to be stored is much smaller than the number of objects rendered.

The recording of AFL states used to render specific objects is achieved by adding an extra slot named afl-state to object document. Initially, the value of this slot is nil, but when a document object is rendered for the first time, a pointer to the AFL state current when the rendering commences is recorded in this slot.

Producing relative readings is now straightforward, using function "read-current-relatively" shown hereinbelow. The AFL block construct is used to set up a lexical scope for the duration of the rendering. The execution of the AFL assignment statement with the AFL state recorded in slot afl-state of the document object to be rendered is sufficient to achieve the desired relative rendering.

```
(defun read-current-relatively()
    "read current selection relatively"
    (save-pointer-excursion
      (cond
        ((afl-state *read-pointer*)
        ;object has already been rendered once
(afl:new-block
          (afl:local-set-state (afl-state
                                *read-pointer*)) ;retrieve
                                state
          (read-aloud *read-pointer* )
          (afl:force-speech )))
        (t (read-current )))))
```

Such relative readings are most useful when reading tables and matrices. As previously described, both tables and matrices are read using stereo effects, with the spatial location of the sound indicating the position of elements in the table. When moving through the elements of a table, hearing each element at the right spatial coordinate is very useful in keeping track of the position of the current selection within the table. Thus, the user can move the current selection to the rightmost column and hear, when moving down this column, each element spoken on the right speaker.

Another example of using such relative readings is when traversing the right-hand side of Faa de Bruno's formula. Moving to the subscript of the summation and then executing "read-current-relatively" results in the constraint being read in the "subscript voice" which serves as an additional reminder to the listener about the position of the current selection.

The browsing capability of the method of the present invention is further enhanced by the introduction of a cross-reference facility. When cross-references are detected, the recognizer 12 (FIG. 1) introduces additional links to the high-level model of the document. The tree structure is augmented by the addition of these links. The browser utilizes these links to allow movement between cross-references.

The browser command that enables this is "read-follow-cross-ref", which is bound to key "g". This command can be executed after executing command "stop", as previously described. By default, this command reads the next cross-reference in the text; a "prefix" argument (C-u keystroke sequence) results in the previous cross-reference being read. This is necessary because a user will usually stop close to, but not necessarily on, a cross-reference.

A more useful technique for following cross-references is provided while reading is in progress; after a cross-reference is read, the system plays a short sound cue that acts as a prompt. When if the user presses the "y" key, the cross-reference is read before continuing with the document reading. This feature almost obviates the need for a user to call command "read-following-cross-ref" interactively.

How particular cross-reference tags that occur in the text body are read depends upon the object being cross-referenced. For example, reading a cross-reference tag to a section object results in the section number and title being read. This is more useful than merely speaking the section number. Typically, the readings of cross-references tags are designed to give as much information as possible without being verbose. Readings of cross-reference tags are able to be customized by thus providing methods on generic function "read-cross-reference"; one such method is shown hereinbelow.

```
(defmethod read-cross-reference ((sectional-unit
                                  sectional-unit))
"Read a sectional unit cross reference"
(read-aloud (sectional-unit-name sectional-unit ))
(when (sectional-unit-number sectional-unit)
  (afl:speak-number-string (sectional-unit-number
                            sectional-unit )))
(afl:comma-intonation)
(read-aloud (title sectional-unit ))
(afl:comma-intonation)
(afl:force-speech))
```

To make a presentation succinct, technical documents often rely on a large number of cross-references. Such cross-references include equations, theorems, etc. Cross-references to these objects occurring in the running text normally use a system-generated number for identification, e.g., equation 3.2.1 etc. Even when reading printed material, this convention may present problems. Consider, for instance, a proof that reads:

By equation 3.1 and theorem 4.2 and equation 8, we get equation 9 and hence the result.

If this example seems difficult to understand when read in print, it becomes essentially useless when encountered in a spoken document where the listener does not have the luxury of quickly scanning back to the cross-references. While the ability to follow a cross-reference tag and listen to the cross-referenced object during the reading does mitigate this problem to some extent, this process is very distracting. To overcome these problems, the browser implementation allows the listener to label objects that can be cross-referenced with meaningful labels when they are first rendered. These user-supplied labels are used later, when reading the cross-reference tags to these objects.

This functionality almost completely obviates the need to follow cross-references during the reading of complex statements.

For example, consider reading a book on Formats' last theorem. The first chapter might introduce the subject by stating the theorem. Assume that this is the first theorem in the book and is numbered theorem 1.1 in the text. The rest of the book might refer to this theorem by number, as in:

As a corollary of this result, we can prove theorem 1.1.

When the corresponding document is rendered by the system in audio, the listener hears the theorem, the system-generated number (i.e., theorem 1.1), followed by a fleeting sound cue. At this point, the user can give the theorem a more meaningful name by pressing the "y" key and entering an appropriate name. In this case, assume the listener enters "Formats' last theorem" when prompted for the label. When rendering cross-references to this theorem, the newly entered label will be used instead of the system-generated theorem number. Thus, the example shown above would be rendered as:

As a corollary of this result, we can prove Formats' last theorem.

The browser also provides a simple bookmark facility that can be used to mark positions of interest which can be returned to later. Browser command "mark-read-pointer", bound to the "m" key, prompts the user for a bookmark name and marks the current position. The marked position can be returned to by executing command "follow-book-mark" bound to the "f" key. Bookmarks can be accessed in two ways; pressing the "f" key will read the marked object without affecting the current selection. Calling this command with a prefix argument, (i.e., "C-u f") results in the current selection being reset to the marked position.

The benefit of the present inventive method as an aid to the visually impaired should be obvious. A new generation of reading machine having the aforementioned capabilities can be produced. The method, when embodied in the environment of a computer terminal, can give new power to personal information systems such as appointment calendars. What may be less obvious are the potential applications of the inventive method to automated telephone systems, voice mail systems, electronic mail with remote query systems, sophisticated language translation systems and other systems requiring synthesized voice output. The inventive method may expand the capability of windowing systems and notebook computers. Applications may be found in automated inquiry systems as used by banks, insurance companies and other such institutions. Another application may be found in personal digital assistance (PDA) devices. The inventive method may find use in the areas of information resources and databases and could make networked electronic libraries useful to sighted and visually impaired alike.

Since modifications and changes varied to fit particular operating requirements and environments will be apparent to those skilled in the art, the invention is not considered limited to the example chosen for purposes of disclosure, and covers all changes and modifications which do not constitute departures from the true spirit and scope of the invention.

Having thus described the invention, what is desired to be protected by Letters Patent is presented in the subsequently appended claims.

What is claimed is:

1. A method of auditorially rendering mathematical expressions, formulas, tables, documents and language, comprising the steps of:

a) formatting mathematical information to be auditorially rendered;

b) transforming the mathematical information of step (a) into a structured representation having the form of a hierarchical tree; and c) using an audio language and rendering rules for operating on the structured representation of the mathematical information of step (b) to produce an audio output, comprising stereo, multivoice parameters, including parameters for adjusting respective left and right volumes.

2. The method of claim 1, wherein the transforming of the mathematical information into a structured representation in accordance with step (b) comprises transforming math objects of the hierarchical tree to a quasi-prefix form.

3. The method of claim 2, wherein math objects are provided with six attribute locations.

4. The method of claim 3, wherein at least one of said six attributes is itself provided with an attribute.

5. The method of claim 1, wherein mathematical notation of said mathematical information of step (b) is assigned precedence levels.

6. The method of claim 1, wherein mathematical information formatted in accordance with step (a) has been marked up in TeX®.

7. The method of claim 1, wherein the audio output of step (c) comprises multivoice parameters including speech rate, volume, voice quality, pitch and intonation.

8. The method of claim 1, wherein the audio output of step (c) comprises stereo multivoice parameters, consisting of left and right volume.

9. The method of claim 1, wherein the audio output of step (c) comprises spatial effects.

10. The method of claim 1, further comprising the step of:
d) interactively operating on said audio output.

11. The method of claim 1, further comprising the step of:
d) browsing through said audio output.

12. The method of claim 1, wherein the audio output of step (c) comprises fleeting and persistent cues.

13. The method of claim 1, wherein the audio output of step (c) comprises recursive substitutions.

14. A method of auditorially rendering mathematical expressions, formulas, tables, documents and language, comprising the steps of:
a) formatting mathematical information to be auditorially rendered, using a mark-up language;

b) transforming the mathematical information of step (a) into a structured representation having the form of a hierarchical tree by projecting mathematical expressions into two-dimensional information, and annotating this structure with attributes; and c) using an audio language and rendering rules for operating on the structured representation of the mathematical information of step (b), to produce a stereophonic, audio output.

15. The method of claim 14, wherein at least one of the attributes of step (b) itself contains a tree structure.

16. The method of claim 14, wherein said transforming step (b) uses recursive substitutions.

17. A method of auditorially rendering mathematical expressions, formulas, tables, documents and language, comprising the steps of:
a) formatting mathematical information to be auditorially rendered using a mark-up language;

b) transforming the mathematical information of step (a) into a structured representation having the form of a hierarchical tree;

c) using an audio language and rendering rules for operating on the structured representation of the mathematical information of step (b), to produce a stereophonic, audio output;

d) listening to the stereophonic, audio output of step (c); and e) interactively traversing said stereophonic, audio output.

* * * * *